(12) United States Patent
Takata et al.

(10) Patent No.: US 9,973,897 B2
(45) Date of Patent: May 15, 2018

(54) INFORMATION PROCESSING APPARATUS, PROGRAM PRODUCT, AND METHOD

(71) Applicants: Tadahiro Takata, Tokyo (JP); Hiroyoshi Kuroda, Kanagawa (JP); Fumihiko Hashizume, Tokyo (JP)

(72) Inventors: Tadahiro Takata, Tokyo (JP); Hiroyoshi Kuroda, Kanagawa (JP); Fumihiko Hashizume, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/437,809

(22) Filed: Feb. 21, 2017

(65) Prior Publication Data
US 2017/0257748 A1  Sep. 7, 2017

(30) Foreign Application Priority Data

Mar. 2, 2016 (JP) ................. 2016-040476

(51) Int. Cl.
| | |
|---|---|
| *H04W 28/02* | (2009.01) |
| *H04W 4/02* | (2018.01) |
| *H04L 29/08* | (2006.01) |
| *H04W 4/00* | (2018.01) |
| *H04W 8/24* | (2009.01) |
| *H04W 8/18* | (2009.01) |

(Continued)

(52) U.S. Cl.
CPC ........... *H04W 4/028* (2013.01); *H04L 67/306* (2013.01); *H04W 4/001* (2013.01); *H04W 4/027* (2013.01); *H04W 8/18* (2013.01); *H04W 8/24* (2013.01); *H04W 64/00* (2013.01); *H04W 4/043* (2013.01)

(58) Field of Classification Search
CPC ....... H04L 41/04; H04L 67/306; G06F 9/542; G06F 9/3009; G06F 3/0481; H04W 4/028; H04W 8/24; H04W 4/001; H04W 4/027
USPC ....... 455/456.6; 719/318; 709/223; 370/338, 370/401
See application file for complete search history.

(56) References Cited

U.S. PATENT DOCUMENTS

| | | | |
|---|---|---|---|
| 2015/0026702 A1* | 1/2015 | Kuroda | G06F 3/0481 719/318 |
| 2015/0254115 A1* | 9/2015 | Kuroda | G06F 9/542 719/318 |

FOREIGN PATENT DOCUMENTS

JP   2014-059203   4/2014

\* cited by examiner

*Primary Examiner* — Phuoc H Doan
(74) *Attorney, Agent, or Firm* — IPUSA, PLLC

(57) ABSTRACT

An information processing apparatus provides provision information based on position information items within a time period of a transmission device that sends out a signal including identification information of the transmission device. The information processing apparatus includes a processor, in communication with a memory, executing a process including storing a correspondence relationship between the identification information of the transmission device and an attribute information item that is information of a holding subject holding the transmission device; storing a threshold defining a predetermined value corresponding to the attribute information item; storing the position information items of the transmission device in time series in association with the identification information; and generating the provision information by acquiring the stored position information items of the transmission device within the predetermined time period, and correcting the acquired (Continued)

information with the use of the attribute information item corresponding to the identification information or the threshold.

11 Claims, 27 Drawing Sheets

(51) Int. Cl.
*H04W 64/00* (2009.01)
*H04W 4/04* (2009.01)

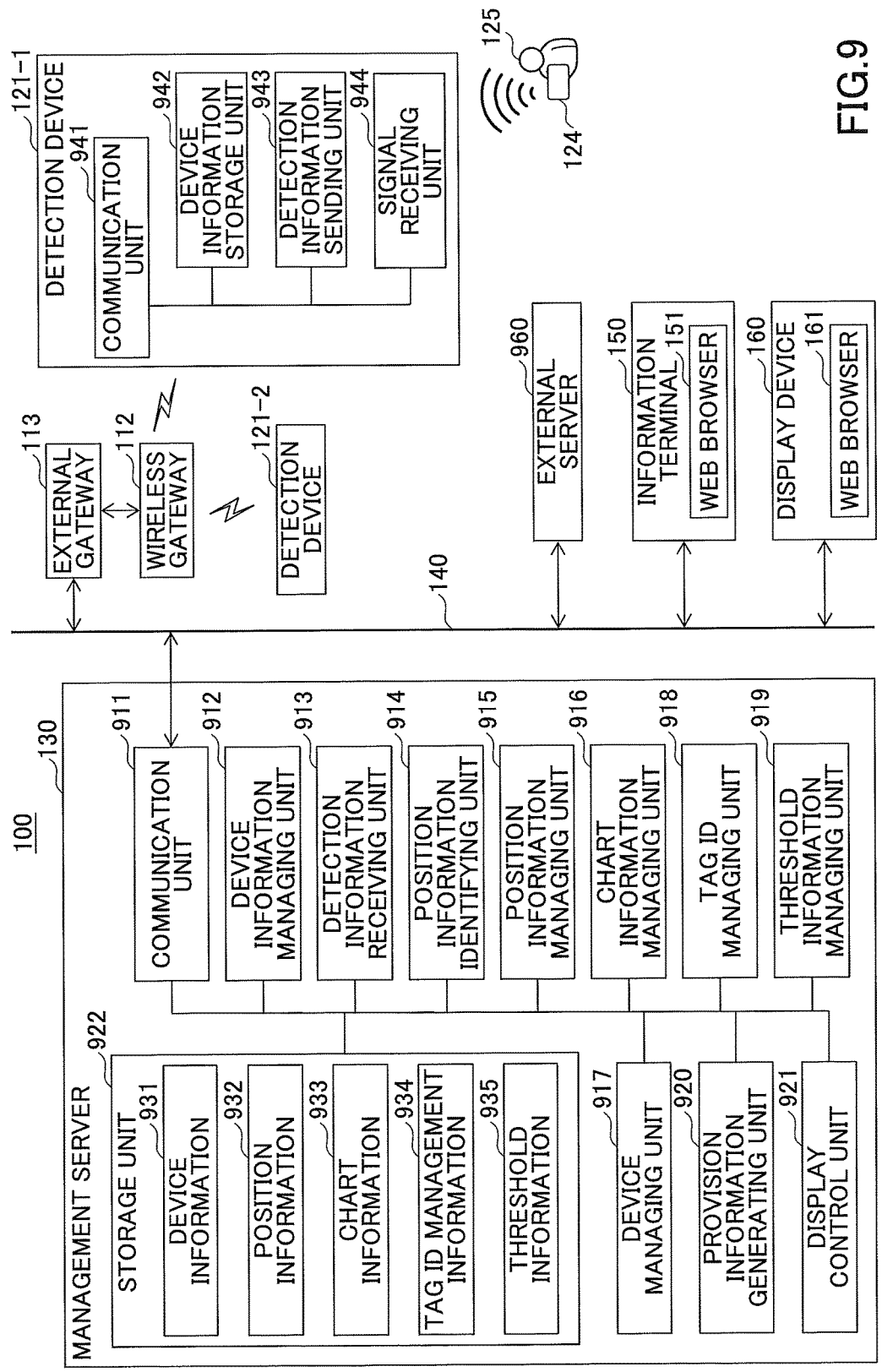

FIG.10A

| DEVICE ID | DEVICE TYPE | FLOOR ID | AREA ID | INSTALLATION POSITION (LATITUDE, LONGITUDE, ALTITUDE) | POSITION ID |
|---|---|---|---|---|---|
| DEV1001 | RFID | FLR10001 | AREA001 | 35.aaaa0010, 135.bbbb0021, 0.2 | RID1001 |
| DEV1002 | RFID | FLR10001 | AREA002 | 35.xxxx0010, 135.yyyy0031, 0.2 | RID1002 |
| ⋮ | ⋮ | ⋮ | ⋮ | ⋮ | ⋮ |
| DEV5001 | RFID | FLR50001 | AREA003 | 35.xxxx0120, 135.yyyy0011, 0.5 | RID5001 |
| DEV5002 | RFID | FLR50001 | AREA003 | 35.xxxx0121, 135.yyyy0033, 0.5 | RID5001 |
| ⋮ | ⋮ | ⋮ | ⋮ | ⋮ | ⋮ |
| ⋮ | ⋮ | ⋮ | ⋮ | ⋮ | ⋮ |

| TAG ID | DETECTION TIME | FLOOR ID | AREA ID | COORDINATE INFORMATION (LATITUDE, LONGITUDE, ALTITUDE) | ... |
|---|---|---|---|---|---|
| TAG0001 | 20xx.1.1 10:10:01 | FLR10001 | AREA001 | 35.aaaa0010, 135.bbbb0021, 0.2 | ... |
| TAG0001 | 20xx.1.1 10:10:02 | FLR10001 | AREA001 | 35.aaaa0010, 135.bbbb0021, 0.2 | ... |
| TAG0001 | 20xx.1.1 10:10:03 | FLR10001 | AREA002 | 35.xxxx0010, 135.yyyy0031, 0.2 | ... |
| TAG0001 | 20xx.1.1 10:10:04 | FLR10001 | AREA002 | 35.xxxx0010, 135.yyyy0031, 0.2 | ... |
| TAG0001 | 20xx.1.1 10:10:05 | FLR10001 | AREA002 | 35.xxxx0010, 135.yyyy0031, 0.2 | ... |
| ... | ... | ... | ... | ... | ... |

| FLOOR ID | FLOOR NAME | FLOOR NUMBER | ALTITUDE (m) | |
|---|---|---|---|---|
| FLR10001 | FLOOR A | 1 | 1 | ... |
| FLR10002 | FLOOR B | 2 | 5 | ... |
| FLR10003 | FLOOR C | 3 | 9 | ... |
| ... | ... | ... | ... | ... |
| FLR20001 | ○○ | FIRST BASEMENT | -5 | ... |
| FLR20002 | ×× | 1 | 0 | ... |
| ... | ... | ... | ... | ... |

| FLOOR ID | AREA ID | AREA NAME | AREA TYPE | MAP ID | AREA WIDTH x DEPTH | ... |
|---|---|---|---|---|---|---|
| FLR10001 | AREA001 | RECEPTION | MANAGEMENT LEVEL 1 | MAP0001 | W1 x D1 | ... |
| | AREA002 | NURSE A | MANAGEMENT LEVEL 2 | MAP0001 | W2 x D2 | ... |
| | AREA003 | NURSE B | MANAGEMENT LEVEL 2 | MAP0001 | W3 x D3 | ... |
| | AREA004 | STORAGE ROOM | MANAGEMENT LEVEL 3 | MAP0001 | W4 x D4 | ... |
| | AREA005 | PRIVATE ROOM A | MANAGEMENT LEVEL 2 | MAP0001 | W5 x D5 | ... |
| | ... | ... | ... | ... | ... | ... |
| ... | | | | | | |

| MAP ID | IMAGE FILE URL | STANDARD POINT (LATITUDE, LONGITUDE) | RELATIVE POSITION (x DIRECTION, y DIRECTION) | SCALE | ROTATION ANGLE | |
|---|---|---|---|---|---|---|
| MAP0001 | URL0001 | aaa, bbb | x1, y1 | 1/50 | 0° | ... |
| MAP0002 | URL0002 | ccc, ddd | x2, y2 | 1/100 | 180° | ... |
| ... | ... | ... | ... | ... | ... | ... |

| TAG ID | ATTRIBUTE INFORMATION | NAME | ... |
|---|---|---|---|
| TAG0001 | PERSON | DOCTOR A | ... |
| TAG0002 | PERSON | PATIENT B | ... |
| TAG0003 | PERSON | NURSE C | ... |
| ... | ... | ... | ... |
| TAG1001 | BED | BED D | ... |
| TAG1002 | EQUIPMENT 1 | TROLLEY E | ... |
| TAG1003 | EQUIPMENT 2 | BLOOD-PRESSURE METER F | ... |
| ... | ... | ... | ... |

| ATTRIBUTE INFORMATION | THRESHOLD | ... |
|---|---|---|
| PERSON | MOVING SPEED OF LESS THAN OR EQUAL TO 5 m/s | ... |
| BED | MOVING SPEED OF LESS THAN OR EQUAL TO 1 m/s | ... |
| EQUIPMENT 1 | MOVING SPEED OF LESS THAN OR EQUAL TO 1.5 m/s | ... |
| EQUIPMENT 2 | MOVING SPEED OF LESS THAN OR EQUAL TO 0.5 m/s | ... |
| ... | ... | ... |

| TAG ID | ATTRIBUTE INFORMATION 1 | ATTRIBUTE INFORMATION 2 | NAME | ... |
|---|---|---|---|---|
| TAG0001 | PERSON | DOCTOR | DOCTOR A | ... |
| TAG0002 | PERSON | PATIENT | PATIENT B | ... |
| TAG0003 | PERSON | NURSE | NURSE C | ... |
| ... | ... | ... | ... | ... |

| ATTRIBUTE INFORMATION 1 | THRESHOLD | ... |
|---|---|---|
| PERSON | MOVING SPEED OF LESS THAN OR EQUAL TO 5 m/s | ... |
| ... | ... | ... |

| ATTRIBUTE INFORMATION 2 | THRESHOLD | ... |
|---|---|---|
| DOCTOR | LESS THAN OR EQUAL TO MANAGEMENT LEVEL 3 | ... |
| NURSE | LESS THAN OR EQUAL TO MANAGEMENT LEVEL 3 | ... |
| PATIENT | LESS THAN OR EQUAL TO MANAGEMENT LEVEL 2 | ... |
| ... | ... | ... |

935b

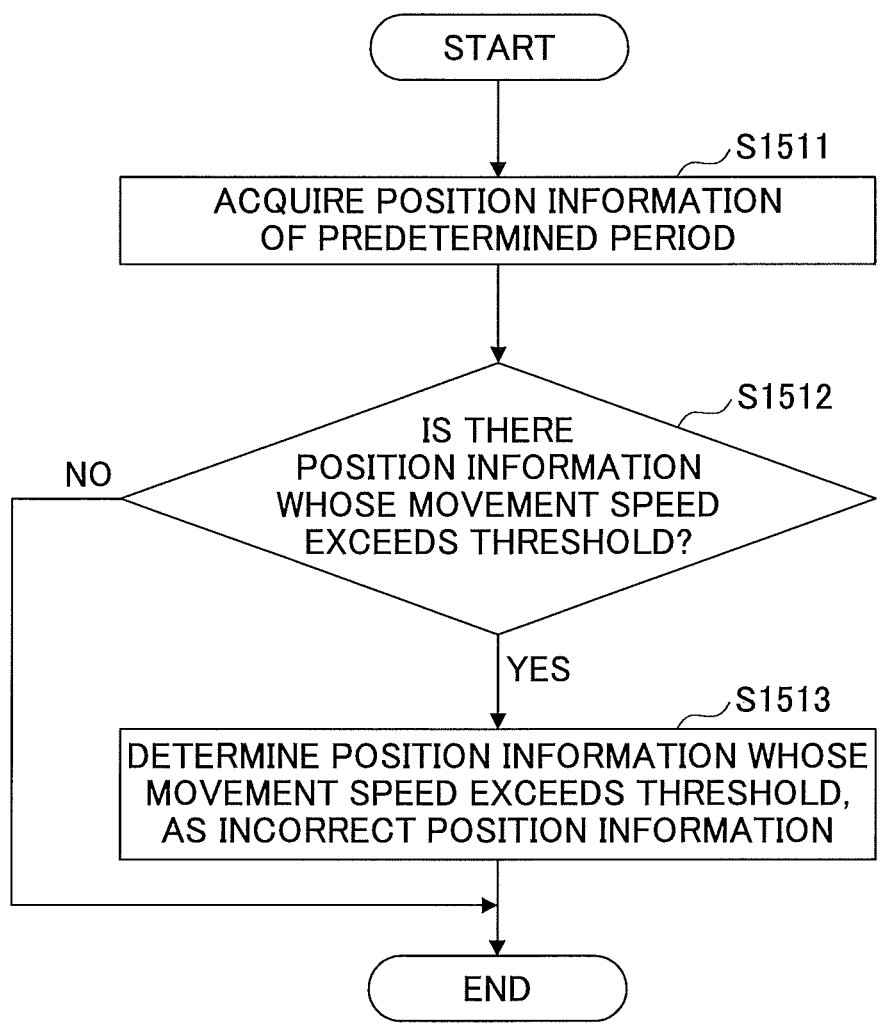

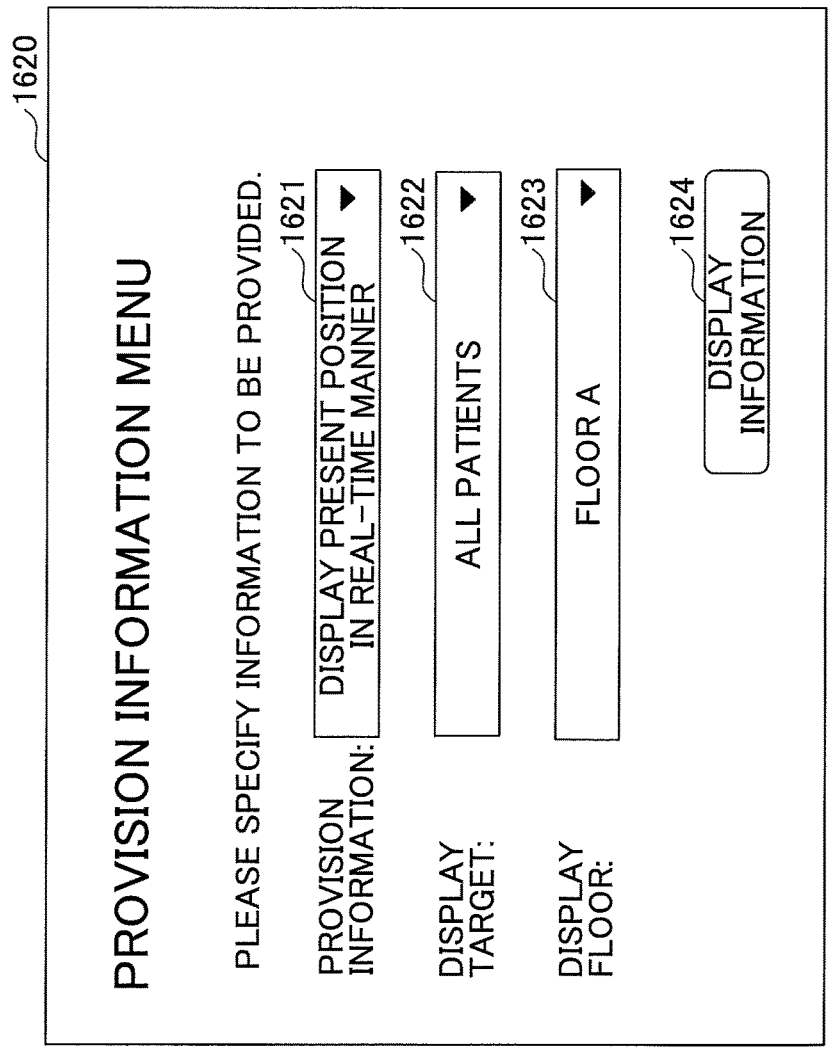

| TAG ID | ATTRIBUTE INFORMATION | NAME | ASSOCIATION ID |
|---|---|---|---|
| TAG0001 | PERSON | DOCTOR A | REF0001 |
| TAG0002 | PERSON | PATIENT B | REF0002 |
| TAG0003 | PERSON | NURSE C | REF0003 |
| ... | ... | ... | ... |

| PATIENT ID | NAME | HOSPITAL ROOM | ASSOCIATION ID |
|---|---|---|---|
| PID3001 | PATIENT B | PRIVATE ROOM A | REF0002 |
| PID3002 | PATIENT 1 | PRIVATE ROOM B | REF0101 |
| PID3003 | PATIENT 2 | PRIVATE ROOM C | REF0201 |
| ... | ... | ... | ... |

INFORMATION PROCESSING APPARATUS, PROGRAM PRODUCT, AND METHOD

CROSS-REFERENCE TO RELATED APPLICATION

The present application claims priority under 35 U.S.C. § 119 to Japanese Patent Application No. 2016-040476, filed on Mar. 2, 2016, the contents of which are incorporated herein by reference in their entirety.

BACKGROUND OF THE INVENTION

1. Field of the Invention

The present invention relates to an information processing apparatus, a program product, and a method.

2. Description of the Related Art

There are information processing systems for managing position information of a terminal device, indoors or outdoors.

As a technology related to such an information processing system, for example, there is known an information processing apparatus for displaying an indoor map or an outdoor map, with the use of a terminal device that can receive positioning signals for indoors and positioning signals for outdoors (see, for example, Patent Document 1). By using such a technology, a service of detecting identification information sent out from a transmission device to detect the position information of a user, may be provided in the future.

Patent Document 1: Japanese Unexamined Patent Application Publication No. 2014-59203

SUMMARY OF THE INVENTION

An aspect of the present invention provides an information processing apparatus, a program product, and a method in which one or more of the above-described disadvantages are reduced.

According to one aspect of the present invention, there is provided an information processing apparatus for providing provision information based on one or more position information items within a predetermined time period of a transmission device that sends out a signal including identification information of the transmission device, the information processing apparatus including a correspondence relationship storage configured to store a correspondence relationship between the identification information of the transmission device and an attribute information item that is information of a holding subject that is holding the transmission device; a threshold storage configured to store a threshold defining a predetermined value corresponding to the attribute information item, for each one of the attribute information items; a position information storage configured to store the one or more position information items of the transmission device in time series in association with the identification information of the transmission device; and a provision information generator configured to generate the provision information by correcting the one or more position information items of the transmission device within the predetermined time period acquired from the position information storage, the one or more position information items being corrected with the use of the attribute information item corresponding to the identification information of the transmission device or the threshold corresponding to the attribute information item.

BRIEF DESCRIPTION OF THE DRAWINGS

Other objects, features and advantages of the present invention will become more apparent from the following detailed description when read in conjunction with the accompanying drawings, in which:

FIG. 9 illustrates a functional configuration of the information providing system according to a first embodiment of the present invention;

FIGS. 10A and 10B illustrate examples of device information and position information according to the first embodiment of the present invention;

FIGS. 11A through 11C illustrate examples of chart information according to the first embodiment of the present invention;

FIGS. 12A through 12E illustrate examples of tag ID management information and threshold information according to the first embodiment of the present invention;

FIGS. 15A and 15B are flowcharts of examples of a process of correcting the position information according to the first embodiment of the present invention;

FIGS. 16A and 16B illustrate examples of a menu screen according to the first embodiment of the present invention;

FIGS. 20A and 20B illustrate examples of tag ID management information and hospitalization information according to the second embodiment of the present invention;

DETAILED DESCRIPTION OF THE PREFERRED EMBODIMENTS

In the service of the related art, which is for detecting identification information sent out from a transmission device to detect the position information of a user, there have been the following cases. Specifically, there have been cases where the identification information sent out from a transmission device is erroneously detected by a remote detection device due to radio wave interference, etc., and incorrect position information is stored. In this case, aberrant flow lines (movement paths) and erroneous present positions, etc., may be provided.

A problem to be solved by an embodiment of the present invention is to reduce the impact of incorrect position information on provision information, in an information processing system for providing the provision information based on position information within a predetermined time period of a transmission device.

Embodiments of the present invention will be described by referring to the accompanying drawings.

<System Configuration>

Figure 1:
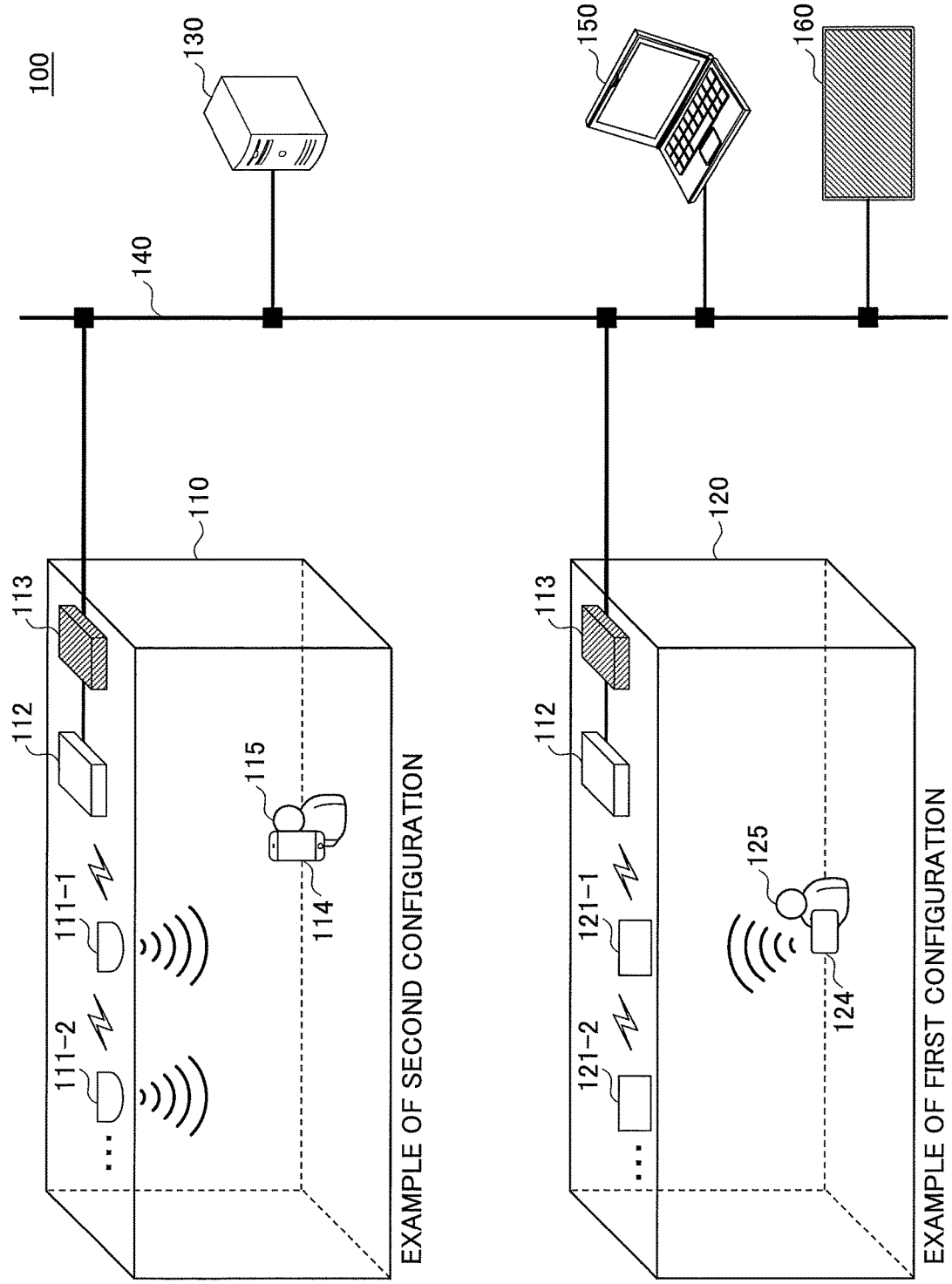
FIG. 1 illustrates an example of a configuration of an information providing system according to an embodiment of the present invention.

FIG. 1 illustrates an example of a configuration of an information providing system 100 according to an embodiment. The information providing system 100 is a system for managing position information indicating a position of an information terminal 114 and a wireless tag 124, by a management server 130 coupled to a network 140. Furthermore, the information providing system 100 uses the managed position information to provide provision information including, for example, the flow line (movement path) and the present position, etc., of a user carrying the information terminal 114 and the wireless tag 124, etc., to an information terminal 150 and a display device 160, etc.

(Example of First Configuration)

In the example of the first configuration indicated on the bottom left of FIG. 1, a plurality of detection devices 121-1, 121-2, and so on, a wireless gateway 112, and an external gateway 113, etc., are installed in an indoor facility 120 such as a building and a facility, etc. Note that in the following description, "detection device 121" is used to indicate any one of the plurality of detection devices 121-1, 121-2, and so on. Furthermore, the number of detection devices 121 in FIG. 1 is one example; the number of detection devices 121 may be another number.

The detection device 121 stores position identification (ID) unique to each of the detection devices 121, and receives a tag ID sent from the wireless tag 124 held by a user 125. Furthermore, the detection device 121 can communicate with the wireless gateway 112 by predetermined wireless communication. The detection device 121 can communicate with the management server 130 via the wireless gateway 112 and the external gateway 113. When the detection device 121 receives (detects) a signal including the tag ID from the wireless tag 124, the detection device 121 sends detection information including the tag ID included in the received signal and the position ID of the detection device 121 itself, to the management server 130.

The wireless gateway 112 is coupled to the external gateway 113. The wireless gateway 112 is a relay device forming a wireless communication network together with the plurality of the detection devices 121, by predetermined wireless communication.

The external gateway 113 is a relay device coupled to the network 140 such as the Internet and a Local Area Network (LAN), etc., and one or more of the wireless gateways 112.

The wireless gateway 112 and the external gateway 113 relay the communication between the plurality of the detection devices 121 and the management server 130. For example, the management server 130 is able to send information to the plurality of the detection devices 121 via the external gateway 113 and the wireless gateway 112. Furthermore, the detection device 121 is able to send information to the management server 130 via the wireless gateway 112 and the external gateway 113.

The wireless tag 124 (transmission device) is an active Radio Frequency Identification (RFID) tag that the user 125 carries or wears, as an employee ID card, an ID card, and a wrist band, etc. The wireless tag 124 is equipped with a built-in battery. The wireless tag 124 sends radio waves (signals) including information (tag ID) recorded in the wireless tag 124, for example, at predetermined time intervals.

The management server 130 (information processing apparatus) is an information processing apparatus having a server function or a system including a plurality of information processing apparatuses.

The management server 130 manages device information. In the device information, the position IDs of the plurality of the detection devices 121 installed at the respective locations, and information items of the locations where the respective detection devices 121 are installed (for example, coordinate information, etc.), are stored in association with each other. When the management server 130 receives the detection information described above from the detection device 121, the management server 130 uses the stored device information to identify the information of the location where the detection device 121 is installed, that is, the position information of the wireless tag 124. Furthermore, the management server 130 stores and manages the identified position information of the wireless tag 124 in a storage unit, in association with the detection time of the position information.

Furthermore, the management server 130 uses the position information of the wireless tag 124 stored in the storage unit to provide the provision information including the flow line (movement path) and the present position, etc., of the wireless tag 124 (or the user 125 carrying the wireless tag 124, etc.), to the information terminal 150 and the display device 160, etc., and to cause the information terminal 150 and the display device 160 to display the provision information.

(Example of Second Configuration)

In the example of the second configuration indicated on the top left of FIG. 1, a plurality of positioning devices 111-1, 111-2, and so on, the wireless gateway 112, and the external gateway 113, etc., are installed in an indoor facility 110 such as a building and a facility, etc. Note that in the following description, "positioning device 111" is used to indicate any one of the plurality of positioning devices 111-1, 111-2, and so on. Furthermore, the number of positioning devices 111 in FIG. 1 is one example; the number of positioning devices 111 may be another number.

The positioning device 111 is a device for sending signals including identification information unique to each positioning device 111 (hereinafter referred to as "position ID") by near field communication such as Bluetooth (registered trademark) Low Energy (hereinafter referred to as "BLE"), and signals such as sound waves. Furthermore, the positioning device 111 is able to communicate with the wireless gateway 112 by predetermined wireless communication.

Preferably, the signals output by the positioning device 111 include access information for acquiring the location information of the location where the positioning device 111 is installed (for example, encrypted Uniform Resource Locator (URL) information, etc.), in addition to the position ID.

The information terminal 114 (terminal device) is an information terminal such as a smartphone, a mobile phone, and a tablet terminal, etc., that is held by a user 115. The information terminal 114 can communicate with the management server 130 by being coupled to the network 140 by using wireless communication such as wireless LAN and Long Term Evolution (LTE), etc.

Furthermore, the information terminal 114 executes an application program (hereinafter referred to as "application") for an information terminal corresponding to the information providing system 100. The information terminal 114 executes an application for an information terminal to receive signals output from the positioning device 111 with a built-in BLE module or a microphone, etc., and to acquire information such as the position ID and access information, etc., included in the received signals.

For example, when the information terminal 114 receives signals from the positioning device 111-1, the information terminal 114 acquires the position ID of the positioning device 111-1 included in the received signals and access information for acquiring the location information of the location where the positioning device 111-1 is installed.

Furthermore, the information terminal 114 determines whether location information of the location where the positioning device 111-1 is installed is stored in the storage unit, based on the acquired information. For example, when the location information stored in the storage unit does not include the position ID acquired from the positioning device 111-1, the information terminal 114 determines that the location information of the location where the positioning device 111-1 is installed is not stored.

When the information terminal 114 determines that the location information of the location where the positioning device 111-1 is installed is not stored, the information terminal 114 uses the access information, etc., acquired from the positioning device 111-1, to request the management server 130 to acquire the location information of the location where the positioning device 111-1 is installed.

Preferably, in the access information acquired from the positioning device 111-1, information such as a URL, etc., for acquiring the location information of the location where the positioning device 111-1 is installed is stored in an encrypted manner.

The management server 130 manages device information. In the device information, the position IDs of the plurality of positioning devices 111 installed at the respective locations, and information items of the locations where the respective positioning devices 111 are installed (for example, coordinate information, etc.), are stored in association with each other, for each of the plurality of locations. When the management server 130 receives, from the information terminal 114, an acquisition request to acquire the location information of the location where the positioning device 111-1 is installed, the management server 130 sends the location information of the location where the positioning device 111-1 is installed, to the information terminal 114.

Preferably, the location information includes the position IDs of all of the positioning devices 111 installed at the location where the positioning device 111-1 is installed, and the coordinate information of the position where each positioning device 111 is installed. Furthermore, this location information includes detailed chart information of the location where the positioning device 111 is installed.

By this location information, the information terminal 114 is able to use the coordinate information of the positioning device 111 that is installed at the location where the positioning device 111-1 is installed, and detailed chart information. The information terminal 114 uses the coordinate information of the positioning device 111 that is installed at the location where the positioning device 111-1 is installed, and detailed chart information, to acquire detailed position information at the location where the positioning device 111-1 is installed.

Furthermore, when the information terminal 114 moves to a different location, the information terminal 114 acquires the location information of the different location, based on signals output from the positioning device 111 installed at the different location. Accordingly, the information terminal 114 can acquire detailed position information of a location at which the information terminal 114 is positioned, at a plurality of locations.

The information terminal 114 sends the acquired position information of the information terminal 114 itself to the management server 130 at predetermined time intervals (for example, at intervals of one second). The management server 130 stores and manages the position information of the information terminal 114 received from the information terminal 114, in the storage unit.

In the present embodiment, among the above two examples of configurations, the example of the first configuration is mainly described.

(Indoor Facility)

Figure 2:
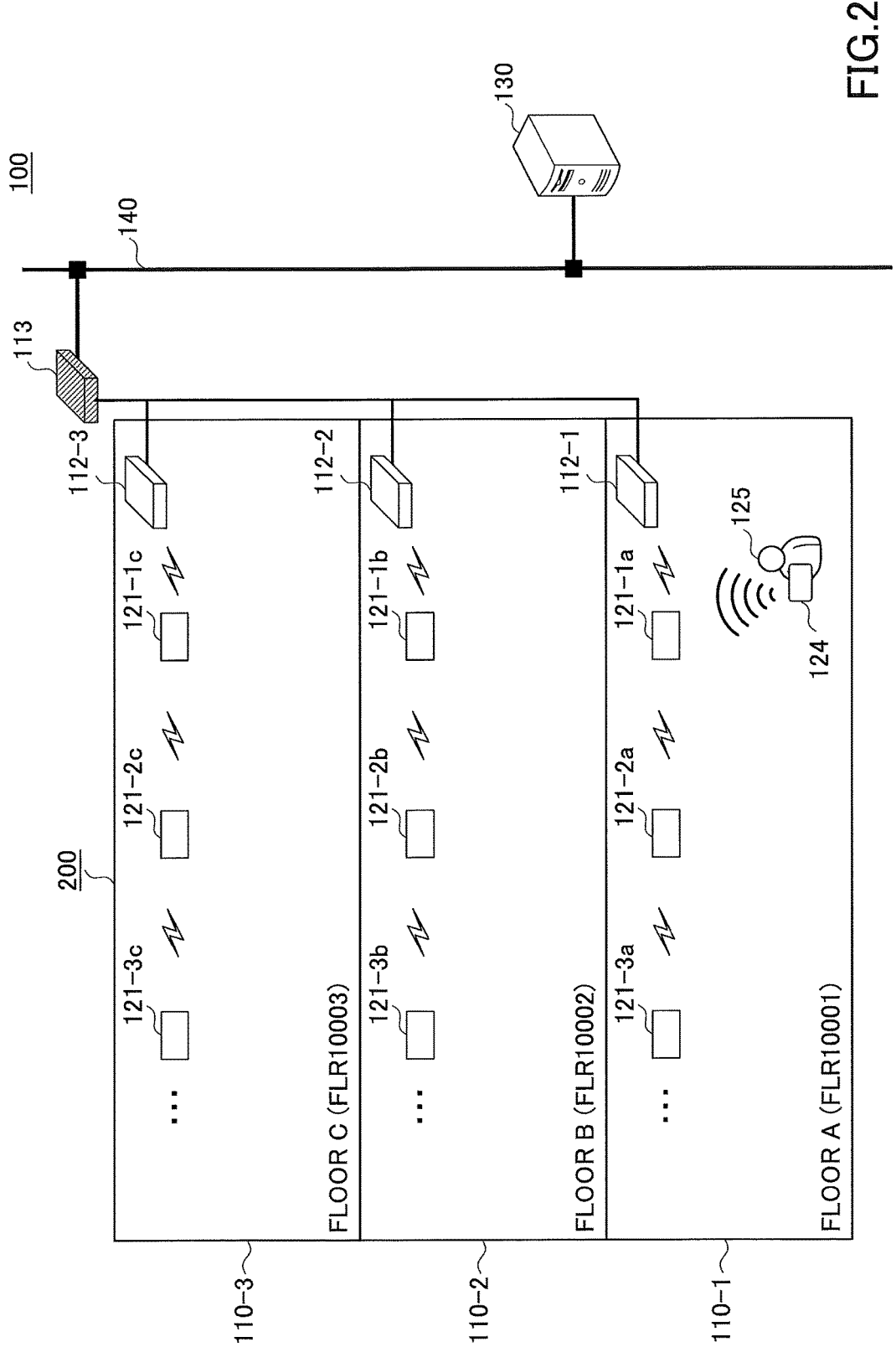
FIG. 2 illustrates an image of an indoor facility according to an embodiment of the present invention.

FIG. 2 illustrates an image of an indoor facility according to an embodiment. In the example of FIG. 2, an indoor facility 200 is a building including the three floors of a floor A 110-1, a floor B 110-2, and a floor C 110-3. As described above, the indoor facility 200 has one or more floors.

Furthermore, a floor ID for identifying the floor is assigned to each floor. In the example of FIG. 2, a floor ID "FLR10001" is assigned to the floor A 110-1, a floor ID "FLR10002" is assigned to the floor B 110-2, and a floor ID "FLR10003" is assigned to the floor C 110-3.

Furthermore, the wireless gateway 112 and the plurality of the detection devices 121 are installed on each floor. For example, on the floor A 110-1, the wireless gateway 112-1 and the plurality of the detection devices 121-1a, 121-2a, 121-3a, and so on, are installed. Furthermore, the location where each of the detection devices 121 is installed is managed by three-dimensional coordinate information including the height direction. This is because in the case of two-dimensional coordinate information, it is not possible to distinguish the positioning devices 111 installed on different floors.

Preferably, the coordinate information indicating the position where the detection device 121 is installed is managed by absolute coordinates of, for example, the latitude, the longitude, and the altitude, etc. Accordingly, information of a plurality of facilities can be managed by a single coordinate system.

Note that, information indicating the floor number may be used as the coordinate information in the height direction; however, in this example, it is assumed that the coordinate information in the altitude direction is the altitude in units of meters, etc. By using the altitude as the coordinate information in the height direction, for example, it is possible to use one type of altitude information to manage an indoor facility having irregular floors such as a mezzanine, and a plurality of facilities having different floor heights.

As illustrated in FIG. 2, the wireless gateways 112-1, 112-2, and 112-3 installed on each floor are coupled to the management server 130 via the external gateway 113.

(Floor)

Figure 3:
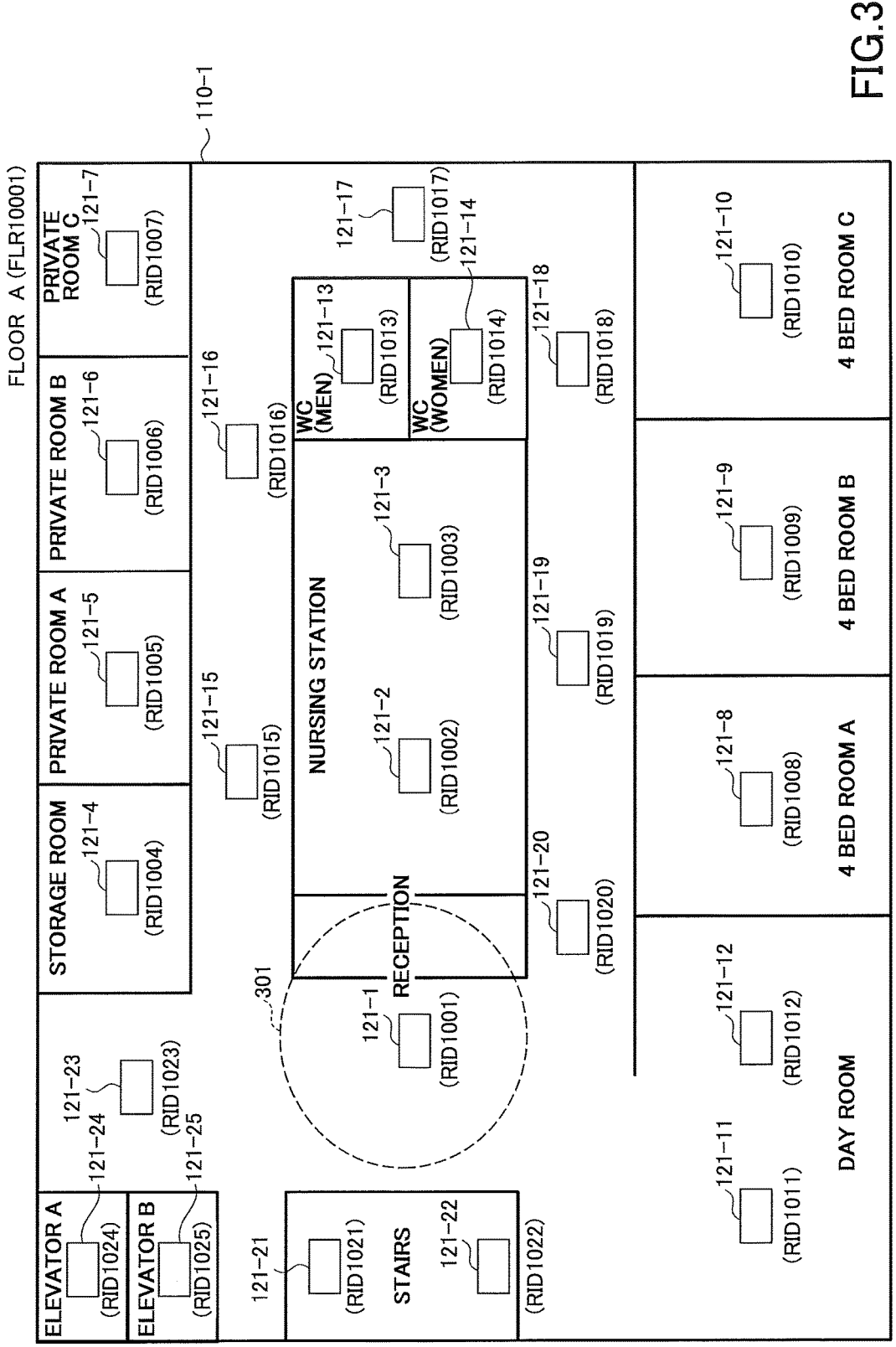
FIG. 3 illustrates an image of a floor according to an embodiment of the present invention.

FIG. 3 illustrates an image of a floor according to an embodiment. In the example of FIG. 3, the floor A 110-1 is an example of a floor in a medical facility such as a hospital.

For example, a plurality of the detection devices 121-1 through 121-23 are installed on the ceiling of the floor A 110-1.

Preferably, the detection devices 121-24 and 121-25 are respectively installed in the elevators A and B.

In FIG. 3, for example, it is assumed that the detection device 121-1 installed in front of the reception receives signals including a tag ID from the wireless tag 124 inside a communication range 301 of the detection device 121-1. Furthermore, each of the detection devices 121 stores a position ID indicated in parenthesis. For example, the detection device 121-1 stores a position ID "RID1001".

(Areas)

Figure 4:
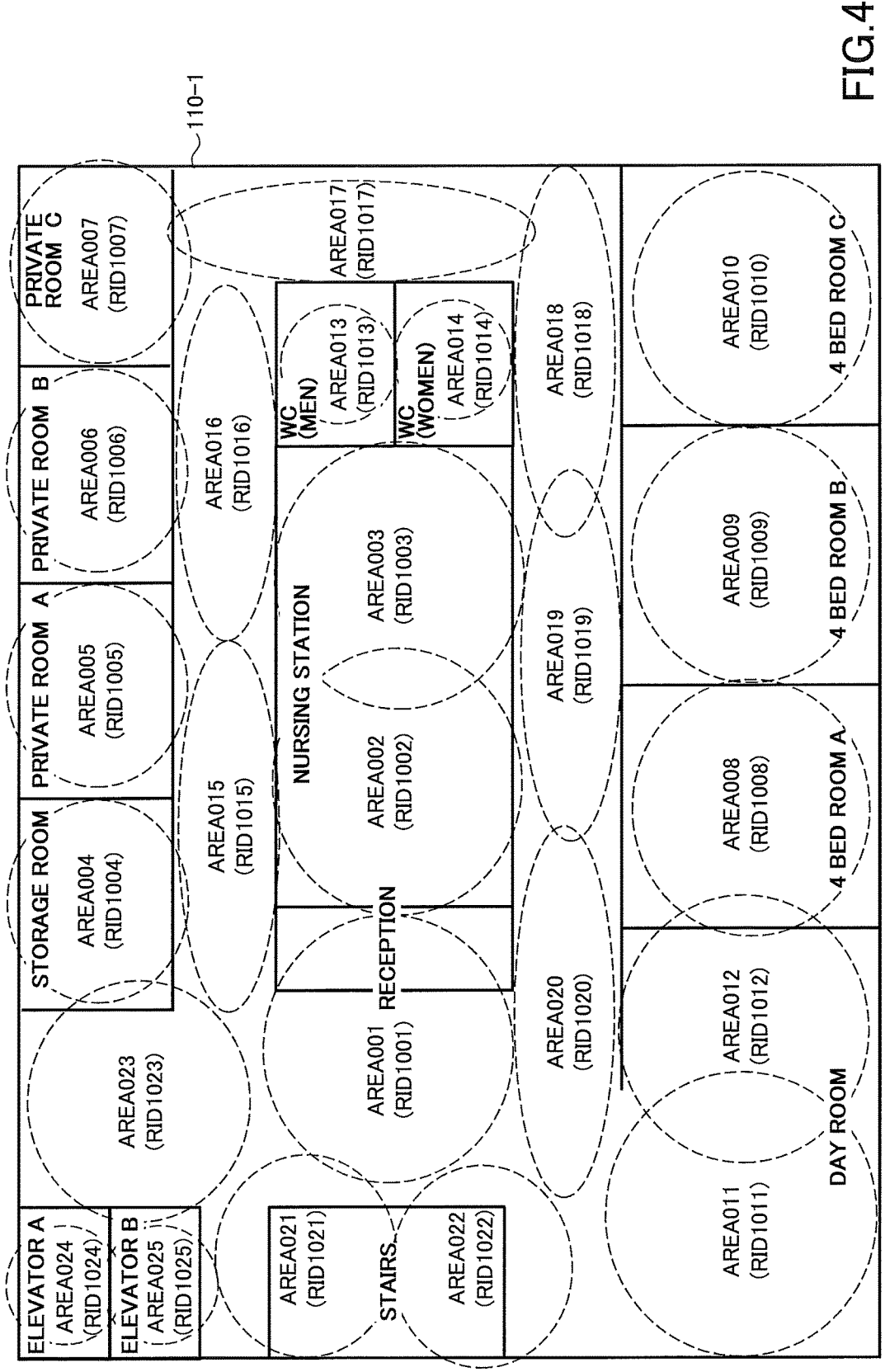
FIG. 4 illustrates an image of areas according to an embodiment of the present invention.

FIG. 4 illustrates an image of areas according to an embodiment. In FIG. 4, the floor A 110-1 is divided into a plurality of areas (regions). To each area, an area ID for identifying the area (AREA001 through AREA023) is assigned. Furthermore, each area corresponds to a communication range (a circle or an oval indicated by a dashed line) of the detection device 121 corresponding the position ID indicated in parenthesis.

For example, the area, which corresponds to the area ID "AREA001" in front of the reception, corresponds to the communication range 301 of the detection device 121-1 having a position ID "RID1001" in FIG. 3. Similarly, the area, which corresponds to the area ID "AREA005" of a private room A, corresponds to the communication range of the detection device 121-5 having a position ID "RID1004" in FIG. 3.

Note that the indoor facility 200, the floor 110-1, and the areas illustrated in FIGS. 2 through 4 are merely examples.

(Position Information and Provision Information)

Figure 5:
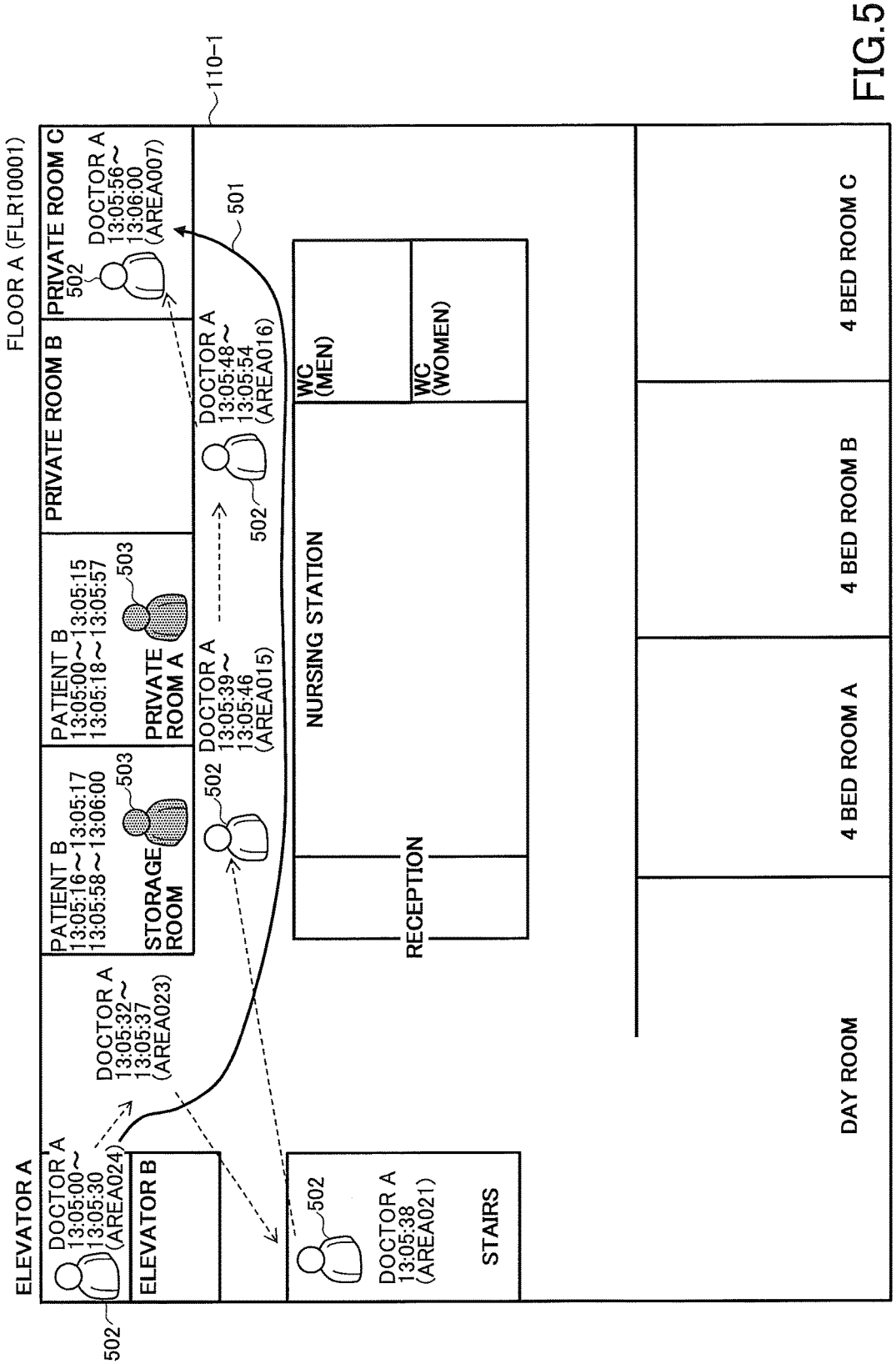
FIG. 5 is for describing position information and provision information according to an embodiment of the present invention.

FIG. 5 is for describing the position information and the provision information according to an embodiment. In FIG. 5, it is assumed that a doctor A502 who is carrying the wireless tag 124 walks into an elevator A at the time 13 h 05 min 00 sec (hereinafter expressed as "13:05:00"), and arrives at floor A at the time "13:05:30". Furthermore, it is assumed that the doctor A steps out of the elevator A, moves along a path indicated by an arrow 501, and arrives at a private room C at the time "13:05:56".

Furthermore, it is assumed that each of the detection devices 121 sends detection information including a tag ID of the detected wireless tag 124 and the position ID of the detection device 121 itself, to the management server 130, every second.

At this time, for example, in the management server 130, position information indicating that the doctor A502 (or the wireless tag 124) has been in the area having the area ID "AREA024" corresponding to the elevator A, from the time "13:05:00" to the time "13:05:30".

Furthermore, for example, in the management server 130, position information indicating that a doctor A has been in the area having the area ID "AREA023", from the time "13:05:32" to the time "13:05:37".

However, in a system of detecting the position information of a user by detecting a tag ID sent out by the wireless tag 124, due to radio wave interference and reflections of radio waves, etc., there may be cases where a remote detection device 121 erroneously detects the tag ID of the wireless tag 124. In the following description, such position information is referred to as "incorrect position information".

In the example of FIG. 5, it is assumed that position information (example of incorrect position information), which indicates that, for example, the doctor A has been in an area having an area ID "AREA021" at the time "13:05:38", is stored in the management server 130.

Furthermore, it is assumed that position information, which indicates that, for example, the doctor A has been in an area having an area ID "AREA015" during the time from "13:05:39" to "13:05:46", is stored in the management server 130.

Furthermore, it is assumed that position information, which indicates that, for example, the doctor A has been in an area having an area ID "AREA016" during the time from "13:05:48" to "13:05:54", is stored in the management server 130.

Next, it is assumed that position information, which indicates that, for example, the doctor A has been in an area having an area ID "AREA007" during the time from "13:05:56" to "13:06:00", is stored in the management server 130.

In this case, for example, by simply displaying the flow line information of the doctor A from "13:05:00" through "13:06:00" by using the position information stored in the management server 130, for example, a flow line including incorrect position information may be displayed, as indicated by the dashed lines in FIG. 5. Therefore, the information providing system 100 according to the present embodiment provides flow line information (an example of provision information) from which such incorrect position information has been removed.

For example, the management server 130 stores in advance an attribute (for example, "person") of the doctor A holding the wireless tag 124, and a threshold for each attribute (for example, the moving speed and the movement distance, etc.). Furthermore, when the management server 130 provides the provision information, the management server 130 makes a correction of setting position information whose attribute exceeds a threshold, as incorrect position information, and generates provision information by removing the incorrect position information.

Another Example

Furthermore, in another example, in FIG. 5, it is assumed that a patient B is hospitalized in a private room A, and that the patient B has been gazing outside from the window of the private room A during the time from "13:05:00" to "13:06:00".

At this time, position information, which indicates that, for example, the patient B (or the wireless tag 124) has been in an area having an area ID "AREA005" corresponding to the private room A during the time from "13:05:00" to "13:06:00", is preferably stored in the management server 130.

However, as described above, in a system for detecting a tag ID sent out by the wireless tag 124 to detect position information of a user, due to radio wave interference and reflections of radio waves, etc., there may be cases where a remote detection device 121 erroneously detects the tag ID of the wireless tag 124. Here, for example, it is assumed that a signal sent by the wireless tag 124 of the patient B is reflected from a building, etc., outside the window, and the detection device 121-4 located in the storage room erroneously detects the tag ID of the wireless tag 124.

For example, it is assumed that position information, which indicates that the patient B has been in an area (storage room) having an area ID "AREA004" during the time from "13:05:16" to "13:05:17" and during the time from "13:05:58" to "13:06:00", is stored in the management server 130.

In this case, for example, when the present position of the patient B at the time "13:06:00" is simply displayed by using the position information stored in the management server 130, for example, present position information indicating that the patient B is in the storage room, is displayed. Therefore, the information providing system 100 according to the present embodiment provides present position information (example of provision information) of the patient B, from which the above-described incorrect position information has been removed.

In one example, the management server 130 provides information of the present position of the patient B, by using a plurality of position information items of the patient B within the past 10 seconds from the present time (example of predetermined time period). For example, as described above, the management server 130 uses the attribute of the patient B holding the wireless tag 124 and a threshold of each attribute, to determine that it is difficult for the patient B to come and go between the private room A and the storage room within such a short period of time. In this case, for example, the management server 130 can determine that the position information of the area ID "RID1004", which is rarely detected, is incorrect position information.

Furthermore, in another example, the management server 130 may store another attribute (for example, "patient") of the patient B holding the wireless tag 124, and the threshold of this other attribute (for example, the management level of areas in which the patient is allowed to enter), etc. For example, in FIG. 5, it is assumed that the management level of the storage room is "management level 3", and that the management level of areas where the patient is able to enter is "management level 2". In this case, the management server 130 can determine the position information, which is detected in the storage room where the management level exceeds "management level 2" that is the management level of areas where the patient is able to enter, as incorrect position information, among the position information items of the patient B.

As described above, the information providing system 100 according to the present embodiment uses the attribute information and the threshold information of the wireless tag 124 to generate provision information from which incorrect position information has been removed, for example, when providing provision information such as the flow line information and information of the present position, etc. Thus, according to the present embodiment, in the information providing system 100 for providing provision information based on the position information of the wireless tag 124 within a predetermined time period, the impact of incorrect position information on the provision information can be reduced.

<Hardware Configuration>
(Hardware Configuration of Computer)

The management server 130 is formed by an information processing apparatus or a plurality of information processing apparatuses having a configuration of a general computer. Furthermore, the information terminal 150 and the display device 160 have a configuration of a general computer. Here, a description is given of a hardware configuration of a general computer.

Figure 6:
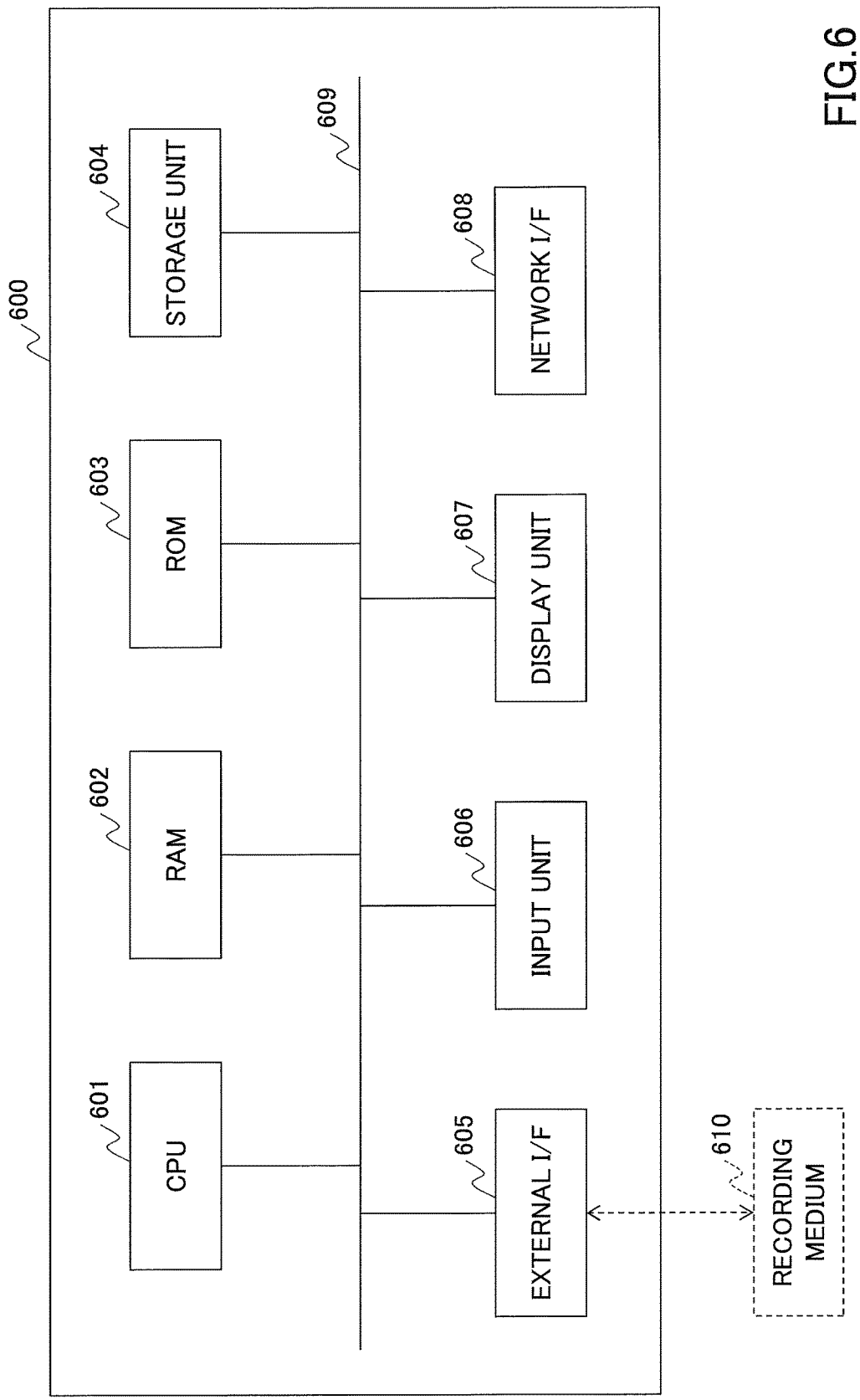
FIG. 6 illustrates an example of a hardware configuration of a computer according to an embodiment of the present invention.

FIG. 6 illustrates an example of a hardware configuration of a computer according to an embodiment. A computer 600 includes, for example, a CPU (Central Processing Unit) 601 (an example of a processor), a RAM (Random Access Memory) 602, a ROM (Read Only Memory) 603, a storage unit 604, an external interface (I/F) 605, an input unit 606, a display unit 607, a network I/F 608, and a bus 609, etc.

The CPU 601 is an arithmetic device for implementing various functions of the computer 600, by loading the programs and data stored in the ROM 603 and the storage unit 604, etc., into the RAM 602, and executing processes. The RAM 602 is a volatile memory used as a work area, etc., of the CPU 601. The ROM 603 is a non-volatile memory for holding programs and data even after the power is turned off.

The storage unit 604 is a storage device such as a HDD (Hard Disk Drive) and SSD (Solid State Drive), etc., and stores an OS (Operating System), an application program, and various kinds of data, etc.

The external I/F 605 is an interface between the computer 600 and an external device. An example of the external device is a recording medium 610, etc. The computer 600 stores a predetermined program in the recording medium 610, and installs the program stored in the recording medium 610 in the computer 600 via the external I/F 605, such that the predetermined program becomes executable.

The input unit 606 is an input device such as a pointing device, a keyboard, or a touch panel etc., and is used by the user for inputting operations in the computer 600.

The display unit 607 is a display device such as display, etc., and displays processing results, etc., by the computer 600.

The network I/F 608 is a communication interface, such as a wired/wireless LAN, etc., for coupling the computer 600 to the network 140.

The bus 609 is coupled to the respective elements described above, and transmits address signals, data signals, and various control signals, etc.

(Hardware Configuration of Wireless Tag)

Figure 7:
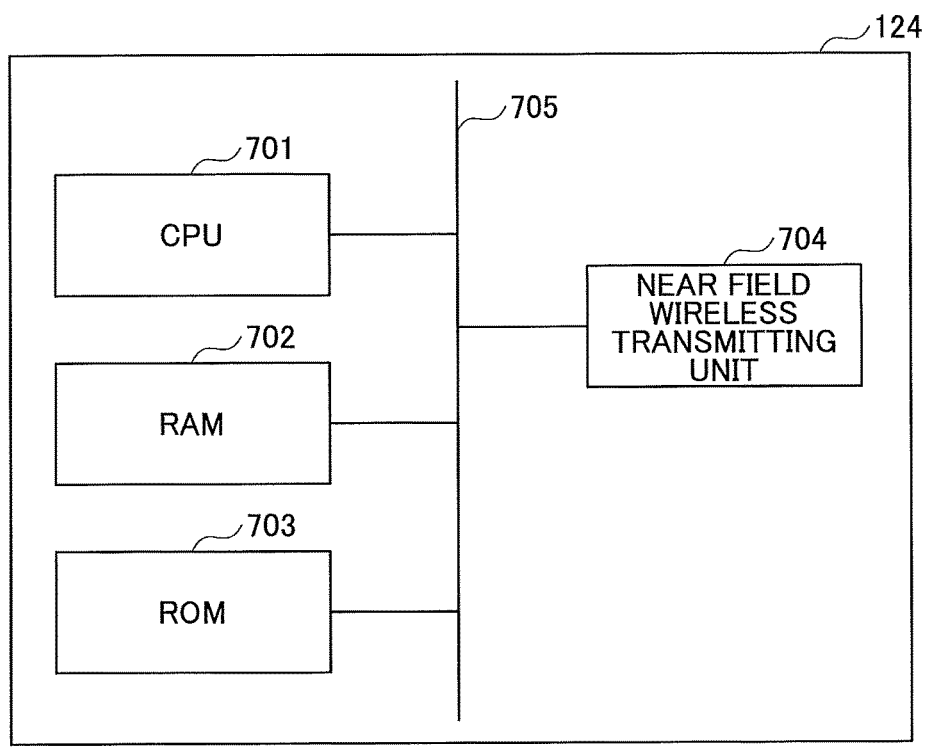
FIG. 7 illustrates an example of a hardware configuration of a wireless tag according to an embodiment of the present invention.

FIG. 7 illustrates an example of a hardware configuration of the wireless tag 124 according to an embodiment.

The wireless tag 124 includes, for example, a CPU 701 (an example of a processor), a RAM 702, a ROM 703, a near field wireless transmitting unit 704, and a bus 705, etc.

The CPU 701 is an arithmetic device for implementing various functions of the wireless tag 124, by executing programs stored in the ROM 703, etc. The RAM 702 is a volatile memory used as a work area, etc., of the CPU 701. The ROM 703 is a non-volatile memory for storing programs, etc., of the wireless tag 124. The ROM 703 may be a rewritable, non-volatile memory such as a flash ROM and an EEPROM (Electrically Erasable Programmable Read-Only Memory), etc.

The near field wireless transmitting unit 704 includes, for example, a transmission circuit for sending predetermined wireless signals of RFID, etc., and an antenna, etc. An example of the predetermined wireless signals is weak radio of a 315 MHz band. In this case, the communicable distance (reach distance) of the predetermined wireless signals sent out by the wireless tag 124 is, for example, approximately 10 m.

The bus 505 is coupled to the respective elements described above, and transmits address signals, data signals, and various control signals, etc.

For example, in a case of managing the position information of a doctor, a nurse, and a patient, etc., at a hospital, the wireless tag 124 is preferably incorporated in a wrist band worn on the wrist, etc., of the patient being hospitalized. Furthermore, the wireless tag 124 carried by medical service personnel such as a doctor and a nurse, etc., is preferably incorporated in, for example, a name tag, a badge, an ID, a wrist band, and a wearable terminal, etc., worn by the medical service personnel.

Note that it is assumed that the wireless tag 124 sends a tag ID stored in advance in the ROM 703, by using the near field wireless transmitting unit 704, at predetermined time intervals (for example, at intervals of one second).

(Hardware Configuration of Detection Device)

Figure 8:
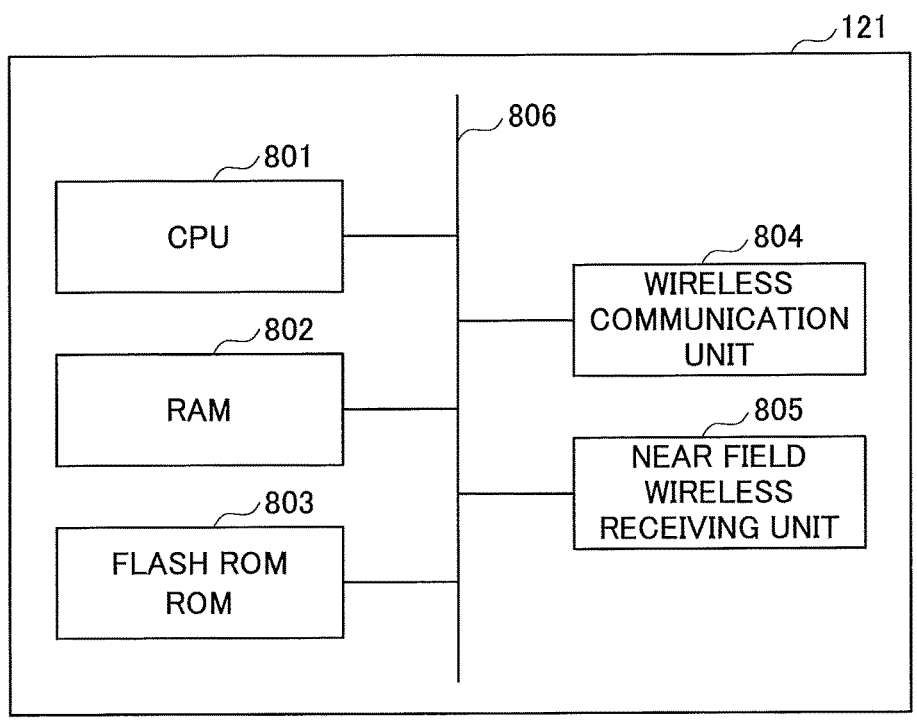
FIG. 8 illustrates an example of a hardware configuration of a detection device according to an embodiment of the present invention.

FIG. 8 illustrates an example of a hardware configuration of the detection device 121 according to an embodiment. The detection device 121 includes, for example, a CPU 801 (an example of a processor), a RAM 802, a flash ROM 803, a wireless communication unit 804, a near field wireless receiving unit 805, and a bus 806, etc.

The CPU 801 is an arithmetic device for implementing various functions of the detection device 121, by executing programs for the detection device 121 stored in the flash ROM 803, etc. The RAM 802 is a volatile memory used as a work area, etc., of the CPU 801. The flash ROM 803 is a non-volatile memory for storing programs, etc., of the detection device 121 and a position ID, etc.

The wireless communication unit 804 is a wireless communication device for communicating with the wireless gateway 112 by a predetermined wireless communication method, and includes, for example, a transmission reception circuit, and an antenna. For example, the wireless communication unit 804 may use a wireless communication device of various kinds of wireless communication methods, such as wireless LAN, Zigbee (registered trademark), or a specific power saving radio circuit (IEEE 802.15.4g) of a 920 MHz band, etc. Here, as one example, the following description is given assuming that the wireless communication unit 804 is a wireless communication device using a specific power saving radio circuit of a 920 MHz band.

The specific power saving radio circuit of a 920 MHz band has a relatively low transmission speed of approximately 200 Kbps, compared to wireless methods such as wireless LAN and Zigbee, etc., using the 2.4 MHz band. On the other hand, by the specific power saving radio circuit of a 920 MHz band, data transmission can be performed up to approximately several hundreds of meters at a consumption current of approximately several tens of milliamperes (mA). By this wireless method, it is possible to send and receive data by saving power and by single hops, whereas in the case of, for example, Zigbee, wireless communication is performed to a gateway by multiple hops.

The near field wireless receiving unit 805 is a wireless receiving device for receiving predetermined wireless signals sent from the wireless tag 124. For example, the near field wireless receiving unit 805 includes a reception circuit and an antenna, etc.

The bus 806 is coupled to the respective elements described above, and transmits address signals, data signals, and various control signals, etc.

First Embodiment

<Functional Configuration>

FIG. 9 illustrates a functional configuration of the information providing system 100 according to a first embodiment. The information providing system 100 includes a plurality of the detection devices 121-1 and 121-2, the wireless gateway 112, the external gateway 113, the wireless tag 124, and the management server 130, etc.

Preferably, the information providing system 100 includes an external server 960, the information terminal 150, and the display device 160, etc.

(Functional Configuration of Management Server)

The management server 130 includes a communication unit 911, a device information managing unit 912, a detection information receiving unit 913, a position information identifying unit 914, a position information managing unit 915, a chart information managing unit 916, a device managing unit 917, a tag ID managing unit 918, a threshold information managing unit 919, a provision information generating unit 920, a display control unit 921, and a storage unit 922.

The communication unit 911 is a means for coupling the management server 130 to the network 140, and for performing communication with the external gateway 113, the external server 960, the information terminal 150, and the display device 160, etc. The communication unit 911 is realized by, for example, the network I/F 608 of FIG. 6 and programs, etc., executed by the CPU 601 of FIG. 6.

The device information managing unit 912 manages device information 931, in which a position ID that is identification information unique to each of a plurality of the detection devices 121 managed by the management server 130, and information of a location where each of the detection devices 121 is installed, are stored in association with each other. The device information managing unit 912 is realized by, for example, programs, etc., executed by the CPU 601 of FIG. 6. An example of the device information 931 managed by the device information managing unit 912 is illustrated in FIG. 10A.

In the example of FIG. 10A, the device information 931 includes information such as a "device ID", a "device type", a "floor ID", an "area ID", an "installation position", and a "position ID", etc.

The "device ID" is identification information for identifying the detection device 121, and is a fixed ID that is not rewritten. The "device type" indicates, for example, the type of the detection device 121. "RFID" indicates that the detection device 121 is a device for detecting the wireless tag 124 by using RFID communication.

The "floor ID" is identification information for identifying the floor on which the detection device 121 is installed. The "area ID" is identification information for identifying the area in which the detection device 121 is installed. The "installation position" is coordinate information of the location where the detection device 121 is installed. In the present embodiment, the coordinate information is expressed by the latitude, the longitude, and the altitude. The "floor ID", the "area ID", and the "installation position" are examples of information of the location where the positioning device 111 is installed.

The "position ID" is identification information unique to the detection device 121, and is a variable ID that is changed, for example, at predetermined time intervals (at intervals of 24 hours, etc.), by the device managing unit 917. The detection device 121 sends, to the management server 130, detection information including the tag ID included in a signal sent from the wireless tag 124 and the position ID of the detection device 121.

The device information managing unit 912 stores the device information 931, for example, as illustrated in FIG. 10A, in the storage unit 922, and manages the device information 931. Alternatively, the device information managing unit 912 may store the device information 931 in an external storage means (for example, the external server 960, etc.), and manage the device information 931.

Referring back to FIG. 9, the description of the functional configuration of the management server 130 is continued.

The detection information receiving unit 913 (detection information receiver) is a means for receiving detection information including the position ID of the detection device 121 and the detected tag ID, sent from the detection device 121. The detection information receiving unit 913 is realized by, for example, programs, etc., executed by the CPU 601 of FIG. 6.

The position information identifying unit 914 (position information identifier) identifies the position information of the wireless tag 124, based on the detection information received by the detection information receiving unit 913 and the device information 931 illustrated in, for example, FIG. 10A. The position information identifying unit 914 is realized by, for example, programs, etc., executed by the CPU 601 of FIG. 6.

For example, when the received detection information includes a position ID "RID1101", the position information identifying unit 914 acquires, from the device information 931 illustrated in FIG. 10A, the floor ID, the area ID, and the installation position corresponding to the position ID "RID1101". The position information identifying unit 914 identifies the acquired floor ID, area ID, and installation position, as the position information of the wireless tag 124 corresponding to the tag ID included in the detection information. Note that the floor ID, the area ID, and the installation position are examples of position information.

The position information managing unit 915 (position information storage) stores the position information of the wireless tag 124 identified by the position information identifying unit 914, in position information 932 in association with the tag ID and the detection time of the wireless tag 124, and manages the position information. The position information managing unit 915 is realized by, for example, programs, etc., executed by the CPU 601 of FIG. 6.

Preferably, the position information managing unit 915 stores the position information of the wireless tag 124 identified by the position information identifying unit 914 in time series according to the passage of time, and manages the position information.

An example of the position information 932 managed by the position information managing unit 915 is illustrated in FIG. 10B. In the example of FIG. 10B, the position information 932 includes information such as a "tag ID", a "detection time", a "floor ID", an "area ID", and "coordinate information", etc.

The "tag ID" is identification information unique to the wireless tag 124 included in a signal sent by the wireless tag 124.

The "detection time" is information indicating the time of detecting or positioning the position information of the wireless tag 124. The detection time may be, for example, the time when the detection information receiving unit 913 has received the detection information, or the time when the position information managing unit 915 has stored the position information, etc.

The "floor ID" is the floor ID of the floor where the wireless tag 124 has been detected. The "area ID" is the area ID of the area where the wireless tag 124 has been detected. The "coordinate information" is coordinate information indicating the position where the wireless tag 124 has been detected, and is expressed by, for example, the latitude, the longitude, and the altitude.

The position information managing unit 915 stores the position information 932, for example, illustrated in FIG. 10B, in the storage unit 922, and manages the position information 932. Alternatively, the position information managing unit 915 may store the position information 932 in an external storage means (for example, the external server 960, etc.), and manage the position information 932.

Referring back to FIG. 9, the description of the functional configuration of the management server 130 is continued.

The chart information managing unit 916 is a means for managing chart information 933 including various kinds of information relevant to a chart. The chart information managing unit 916 is realized by, for example, programs, etc., executed by the CPU 601 of FIG. 6.

Examples of the chart information 933 managed by the chart information managing unit 916 are illustrated in FIGS. 11A through 11C. In the examples of FIGS. 11A through 11C, the chart information 933 includes floor information 1101, area information 1102, and map information 1103.

FIG. 11A illustrates an example of the floor information 1101. In the example of FIG. 11A, the floor information 1101 includes information such as a "floor ID", a "floor name", a "floor number", and the "altitude", etc.

The "floor ID" is identification information for identifying each floor. The "floor name" is the name of each floor. The "floor number" is information indicating the floor number of each floor. The "altitude" is information indicating the altitude of each floor, for example, in meters.

FIG. 11B illustrates an example of the area information 1102. The area information 1102 is information of areas included in each floor. In the example of FIG. 11B, the area information 1102 includes information such as a "floor ID", an "area ID", an "area name", an "area type", a "map ID", and "area width×depth", etc.

The "floor ID" is identification information for identifying each floor. The "area ID" is identification information of each area included in the floor. The "area name" is information indicating the name of each area.

The "area type" is information indicating the type of each area. In the example of FIG. 11B, the management level is stored as the "area type". An area having a management level 1 is, for example, an area where all of the patients can freely enter and exit. Furthermore, an area having a management level 2 is an area where basically only particular patients can enter and exit. Furthermore, an area having a management level 3 is, for example, an area where patients cannot enter. Note that the management level is an example of an area type.

The "map ID" is identification information for identifying map data (for example, an image file of a chart) corresponding to each area. The "area width×depth" is information indicating the size of the area.

FIG. 11C illustrates an example of the map information 1103. The map information 1103 is information of map data (chart data) corresponding to each area. In the example of FIG. 11C, the map information 1103 includes information such as a "map ID", an "image file URL", a "standard point (latitude and longitude)", a "relative position (x direction and y direction)", a "scale", and a "rotation angle", etc.

The "map ID" is identification information for identifying map data. The "image file URL" is URL information (example of reference information) for acquiring map data. The "standard point (latitude and longitude)" is information indicating the standard point of the map data. The "relative position (x direction and y direction)" is information indicating the position with respect to the standard point in the map data. The "scale" is information indicating the scale of the map data. The "rotation angle" is information indicating the rotation angle of the map data.

Note that the floor information 1101, the area information 1102, and the map information 1103 illustrated in FIGS. 11A through 11C are examples of the chart information 933 managed by the chart information managing unit 916. For example, the "image file URL" in the map information 1103 may be the object storing the image file, instead of URL information.

Note that the acquisition destination of an image file indicated by the "image file URL" of the map information 1103 may be the management server 130, or a cloud (for example, the external server 960, etc.) other than the management server 130.

When the acquisition destination of an image file indicated by the "image file URL" is the management server 130, the chart information managing unit 916 further stores the image file of the map data in the storage unit 922, and manages the image file.

Referring back to FIG. 9, the description of the functional configuration of the management server 130 is continued.

The device managing unit 917 is a means for managing a plurality of the detection devices 121 included in the information providing system 100. The device managing unit 917 is realized by, for example, programs, etc., executed by the CPU 601 of FIG. 6.

The device managing unit 917 changes the position ID of the device information 931 illustrated in FIG. 10A, and reports the changed position ID to each of the detection devices 121, for example, at predetermined time intervals (at intervals of 24 hours, etc.).

In another example, the device managing unit 917 may change an encryption key for encrypting the position ID, instead of changing the position ID, and report the changed encryption key to each of the detection devices 121.

The tag ID managing unit 918 (correspondence relationship storage) is a means for storing the correspondence relationship between the tag ID of the wireless tag 124 and attribute information that is information of the holding subject that is holding the wireless tag 124. The tag ID managing unit 918 is realized by, for example, programs, etc., executed by the CPU 601 of FIG. 6.

For example, the tag ID managing unit 918 stores the tag ID of the wireless tag 124 and attribute information of the person carrying the wireless tag 124 or an object to which the wireless tag 124 is attached in association with each other in tag ID management information 934, and manages this information. Alternatively, the tag ID managing unit 918 may store the tag ID management information 934 in an external storage means (for example, the external server 960, etc.), and manage the tag ID management information 934.

In the above descriptions, the holding subject that is holding the wireless tag 124 is a person such as a doctor, a nurse, and a patient, etc.; however, the holding subject of the wireless tag 124 may be an object such as a bed or medical equipment, etc.

The threshold information managing unit 919 (threshold storage) is a means for storing a threshold defining a predetermined value corresponding to each attribute information item, with respect to each attribute information item. The threshold information managing unit 919 is realized by, for example, programs, etc., executed by the CPU 601 of FIG. 6.

For example, the threshold information managing unit 919 stores a threshold for each attribute information item in threshold information 935 in the storage unit 922. Alternatively, the threshold information managing unit 919 may store the threshold information 935 in an external storage means (for example, the external server 960, etc.), and manage the threshold information 935.

FIGS. 12A through 12E illustrate examples of the tag ID management information 934 and the threshold information 935 according to the first embodiment.

FIGS. 12A and 12 B respectively illustrate examples of the tag ID management information 934 and the threshold information 935. In the example of FIG. 12A, the tag ID management information 934 includes information such as a "tag ID", "attribute information", and a "name", etc.

The "tag ID" is identification information of the wireless tag 124. The "attribute information" is information of the holding subject that is holding the wireless tag 124. In the example of FIG. 12A, attributes such as person, bed, equipment 1, and equipment 2, etc., are indicated. The "name" is information indicating the name of the holding subject that is holding the wireless tag 124. Note that attribute information items such as person, bed, equipment 1, and equipment 2, etc., are examples.

Furthermore, in the example of FIG. 12B, the threshold information 935 includes information such as "attribute information" and "threshold", etc. In the threshold information 935, a threshold is stored for each attribute information item. In the example of FIG. 12B, the threshold is expressed by threshold of a moving speed.

The management server 130 can determine that position information, which indicates a moving speed exceeding the threshold "moving speed of less than or equal to 5 m/s" corresponding to "person", is incorrect position information, when the attribute information of the wireless tag 124 is "person".

FIGS. 12C through 12E respectively illustrate other examples of the tag ID management information 934 and the threshold information 935. In the example of FIG. 12C, the tag ID management information 934 includes information such as a "tag ID", "attribute information 1", "attribute information 2", and a "name", etc. In addition to the information in the tag ID management information 934 illustrated in FIG. 12A, the tag ID management information 934 illustrated in FIG. 12C includes an information item of "attribute information 2". In this way, the tag ID management information 934 may include a plurality of attribute information items.

In the example of FIG. 12C, the attribute information 2 further classifies "person" of the attribute information 1 into the attributes of doctor, patient, and nurse.

Furthermore, the examples of FIGS. 12D and 12E include threshold information 935a and threshold information 935b respectively corresponding to the attribute information 1 and the attribute information 2. Among these, the threshold information 935a is the same information as the threshold information 935 indicated in FIG. 12B.

Furthermore, in the threshold information 935b, a threshold of a management level is stored for each of the attribute information items 2. In this example, when the position information of "patient" in attribute information 2 is detected in an area (for example, an area having a management level 3) having a management level that exceeds the threshold "less than or equal to management level 2", the position information can be determined as incorrect position information.

The provision information generating unit 920 (provision information generator) corrects the position information of the wireless tag 124 stored in the position information 932 by the position information managing unit 915, by using attribute information corresponding to the wireless tag 124 or a threshold corresponding to attribute information, to generate provision information to be provided by the management server 130. The provision information generating unit 920 is realized by, for example, programs, etc., executed by the CPU 601 of FIG. 6.

For example, the provision information generating unit 920 determines, as incorrect position information, position information that exceeds the threshold corresponding to the wireless tag 124, among the position information items of the wireless tag 124 stored in the position information 932 by the position information managing unit 915. Furthermore, the provision information generating unit 920 creates provision information by removing incorrect position information from the position information of the wireless tag 124 stored in the position information 932 by the position information managing unit 915.

The display control unit 921 (display controller) is a means for displaying the provision information generated by the provision information generating unit 920, on the information terminal 150 and the display device 160, etc. The display control unit 921 is realized by, for example, programs, etc., executed by the CPU 601 of FIG. 6. For example, the display control unit 921 sends the provision information generated by the provision information generating unit 920, to a web browser 151 of the information terminal 150 or a web browser 161 of the display device 160, to have the provision information displayed.

The storage unit 922 stores, for example, the device information 931, the position information 932, the chart information 933, the tag ID management information 934, and the threshold information 935, etc., described above. The storage unit 922 is realized by, for example, the storage unit 604 of FIG. 6 and programs, etc., executed by the CPU 601 of FIG. 6. For example, the storage unit 922 may be provided in a server device (for example, the external server 960, etc.) other than the management server 130, or in a database server or a storage server in the management server 130, etc.

Note that the configuration of the management server 130 illustrated in FIG. 9 is one example; the elements included in the management server 130 may be provided in a distributed manner in a plurality of information processing apparatuses.

(Functional Configuration of Detection Device)

The detection device 121 (detection devices 121-1 and 121-2) includes a communication unit 941, a device information storage unit 942, a detection information sending unit 943, and a signal receiving unit 944, etc.

The communication unit 941 is a means for communicating with the management server 130, for example, via the wireless gateway 112 and the external gateway 113. The communication unit 941 is realized by, for example, the wireless communication unit 804 of FIG. 8 and programs, etc., executed by the CPU 801 of FIG. 8.

Note that the configuration in which the communication unit 941 communicates with the management server 130 via the wireless gateway 112 and the external gateway 113 is one example. The communication unit 941 may have another configuration as long as communication can be performed with the management server 130.

The device information storage unit 942 is a means for storing the position ID, etc., reported from the management server 130. The device information storage unit 942 is realized by, for example, the flash ROM 803 of FIG. 8 and programs, etc., executed by the CPU 801 of FIG. 8.

The detection information sending unit 943 sends detection information including the tag ID of the wireless tag 124 included in the signal received by the signal receiving unit 944, and the position ID stored in the device information storage unit 942, to the management server 130 via the communication unit 941. The detection information sending unit 943 is realized by, for example, programs, etc., executed by the CPU 801 of FIG. 8.

The signal receiving unit 944 receives the signal (radio wave) including the tag ID of the wireless tag 124 sent from the wireless tag 124, and reports the tag ID included in the received signal, to the detection information sending unit 943. The signal receiving unit 944 is realized by, for example, the near field wireless receiving unit 805 of FIG. 8 and programs, etc., executed by the CPU 801 of FIG. 8.

(Other Functional Configurations)

The wireless tag 124 sends a tag ID that is identification information unique to the wireless tag 124 at predetermined time intervals (for example, at intervals of one second).

The functions of the external gateway 113 and the wireless gateway 112 are to relay the communication between the management server 130 and the detection device 121.

The external server 960 is an example of a server device (for example, a cloud service, etc.) other than the management server 130, coupled to the network 140.

The information terminal 150 is an information processing apparatus such as a personal computer (PC) and a tablet terminal, etc. For example, the user uses the web browser 151 to access the management server 130, to display the provision information provided by the management server 130.

The display device 160 is a display device such as a television set or a digital signage panel, etc., including the web browser 161.

<Process Flow>

Next, a description is given of a process flow of an information processing method performed by the information providing system 100.

(Process of Registering Position Information)

Figure 13:
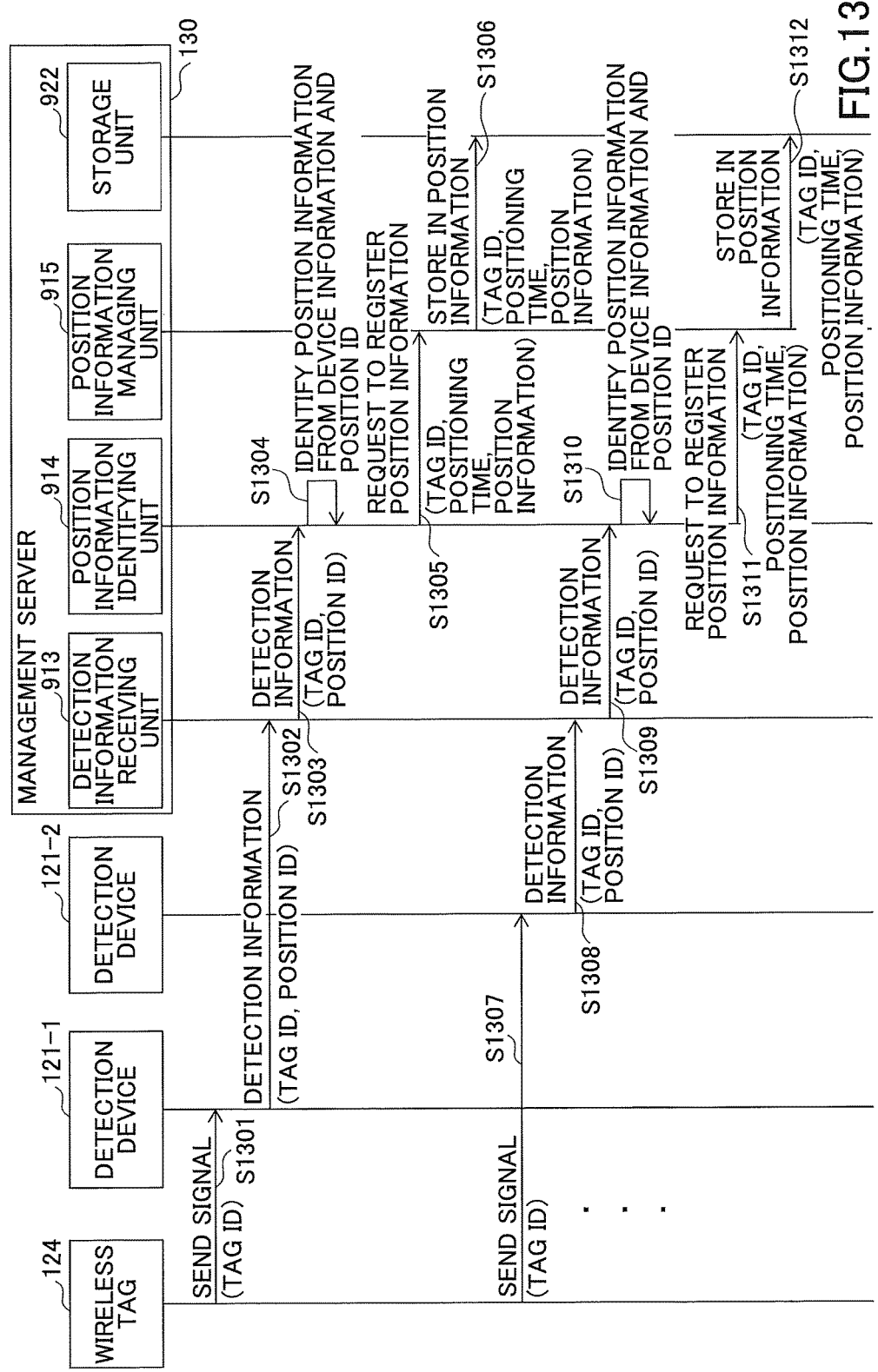
FIG. 13 is a sequence diagram illustrating an example of a process of registering position information according to the first embodiment of the present invention.

FIG. 13 is a sequence diagram illustrating an example of a process of registering position information according to the first embodiment.

Note that it is assumed that the wireless tag 124 is sending signals including the tag ID of the wireless tag 124 at a first time interval (for example, at intervals of one second). Furthermore, it is assumed that the detection devices 121-1 and 121-2 are continuously receiving signals sent from the wireless tag 124, and the detection devices 121-1 and 121-2 are sending detection information to the management server 130 at a second time interval (for example, at intervals of one second).

Furthermore, the wireless gateway 112 and the external gateway 113 are merely for relaying the information, and are thus omitted from the drawings and descriptions.

In step S1301, the wireless tag 124 sends a signal including the tag ID of the wireless tag 124.

In step S1302, the detection device 121-1, which has received the signal sent from the wireless tag 124, sends detection information including the tag ID included in the received signal and the position ID of the detection device 121-1 itself, to the management server 130.

In step S1303, the detection information receiving unit 913 of the management server 130 receives the detection information sent from the detection device 121-1, and reports the received detection information to the position information identifying unit 914.

In step S1304, the position information identifying unit 914 of the management server 130 identifies the position information of the detection device 121-1 that has sent the detection information, that is, the position information of the wireless tag 124, based on the position ID included in the detection information and the device information 931. For example, the position information identifying unit 914 extracts, from the device information 931 as illustrated in FIG. 10A, the position information (for example, the installation position, the floor ID, and the area ID, etc.) corresponding to the position ID included in the detection information.

In step S1305, the position information identifying unit 914 reports a registration request to request the registration of the position information of the wireless tag 124 identified in step S1304, to the position information managing unit 915. The registration request to register the position information includes, for example, the tag ID of the wireless tag 124 included in the detection information, the positioning time, and the position information of the wireless tag 124 identified in step S1304, etc.

Note that the positioning time included in the registration request to register the position information may be sent by being added to the detection information when the detection device 121-1 sends the detection information, or may be information of the time when the detection information receiving unit 913 receives the detection information from the detection device 121-1.

In step S1306, the position information managing unit 915 of the management server 130 stores the position information of the wireless tag 124 in the position information 932, for example, illustrated in FIG. 10B, stored in the storage unit 922, etc., based on the registration request to register the position information from the position information identifying unit 914.

In step S1307, the wireless tag 124 sends a signal including the tag ID of the wireless tag 124. At this time, it is assumed that the user 125 of the wireless tag 124 has moved to a different position, and the signal sent by the wireless tag 124 is received by the detection device 121-2.

In step S1308, the detection device 121-2, which has received the signal sent from the wireless tag 124, sends detection information including the tag ID included in the received signal and the position ID of the detection device 121-2 itself, to the management server 130.

In step S1309, the detection information receiving unit 913 of the management server 130 receives the detection information sent from the detection device 121-2, and reports the received detection information to the position information identifying unit 914.

In step S1310, the position information identifying unit 914 of the management server 130 identifies the position information of the detection device 121-2 that has sent the detection information, that is, the position information of the wireless tag 124, based on the position ID included in the detection information and the device information 931.

In step S1311, the position information identifying unit 914 reports a registration request to request the registration of the position information of the wireless tag 124 identified in step S1310, to the position information managing unit 915.

In step S1312, the position information managing unit 915 of the management server 130 stores the position information of the wireless tag 124 in the position information 932 stored in the storage unit 922, etc., based on the registration request to register the position information from the position information identifying unit 914.

By the above process, for example, as illustrated in FIG. 10B, the tag ID of the wireless tag 124, the detection time, and the position information of the wireless tag (coordinate information, a floor ID, an area ID, etc.) are stored in the position information 932 in association with each other.

(Process of Providing Information)

Figure 14:
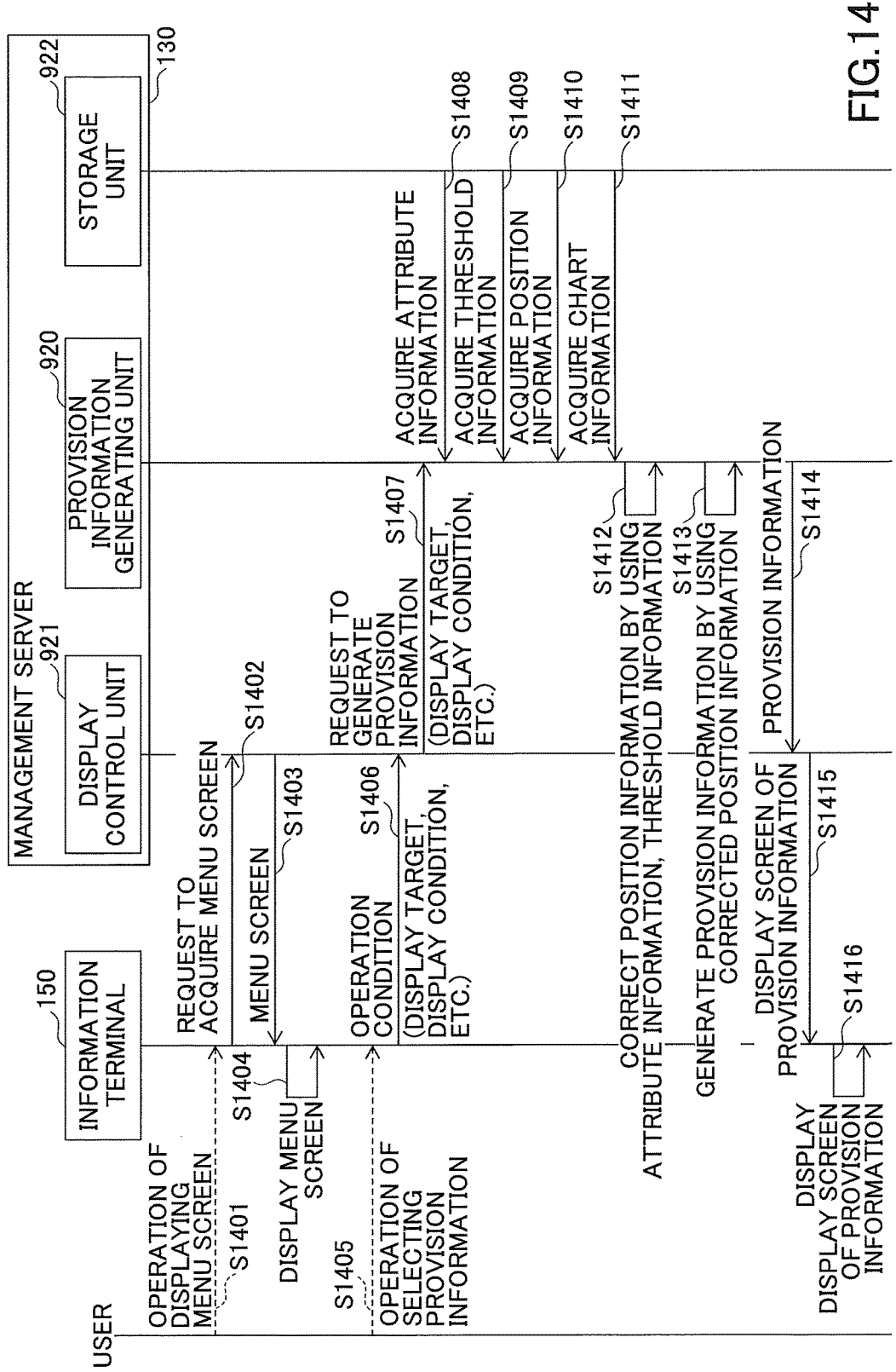
FIG. 14 is a sequence diagram illustrating an example of a process of providing information according to the first embodiment of the present invention.

FIG. 14 is a sequence diagram illustrating an example of a process of providing information according to the first embodiment.

The management server 130 uses the position information 932 stored by the process of FIG. 13 to provide the provision information for displaying the present position and the past flow lines, etc., of the user 125 carrying the wireless tag 124.

In step S1401, the user performs an operation of displaying the menu screen on the information terminal 150. For example, the user selects a predetermined URL with the web browser 151 of the information terminal 150, to perform the operation of displaying the menu screen. Note that the dashed line arrows in FIG. 14 indicate operations by the user.

In step S1402, the web browser 151 of the information terminal 150 sends a request to acquire the menu screen, to the display control unit 921 (web server) of the management server 130.

In step S1403, the display control unit 921 of the management server 130 sends the requested menu screen to the information terminal 150 that is the request source.

In step S1404, the web browser 151 of the information terminal 150 displays the menu screen received from the management server 130, on the display unit 607. An example of the menu screen displayed by the web browser 151 at this time is illustrated in FIGS. 16A and 16B.

Figure 16A:
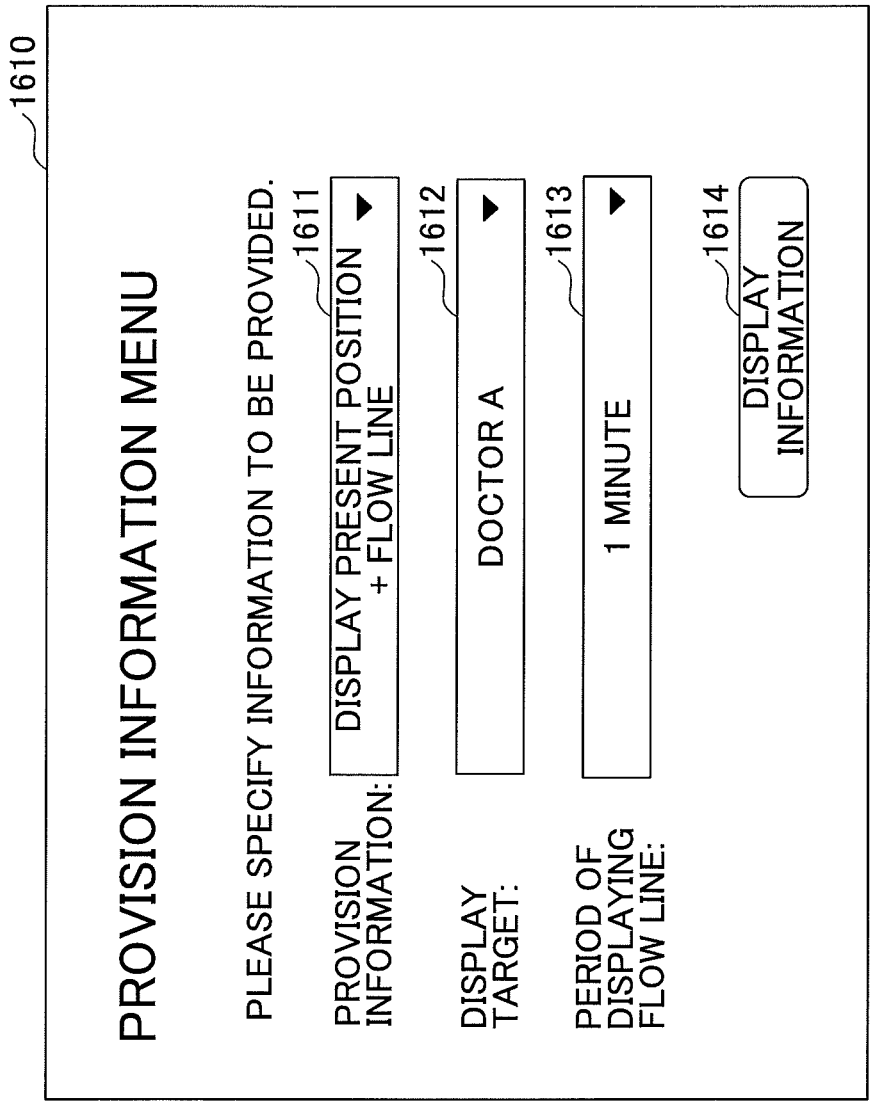

FIG. 16A illustrates an example of a menu screen displayed by the web browser 151. In a menu screen 1610, a pull-down menu 1611 of provision information for selecting the provision information to be displayed, and a pull-down menu 1612 of a display target for selecting a display target, etc., are displayed. Furthermore, in the example of FIG. 16A, "display present position+flow line" is selected as the provision information. In this case, a pull-down menu 1613 of a period of displaying the flow line, for selecting the time period of displaying the flow line, etc., is displayed.

In the example of FIG. 16A, as the user selects a "display information" button 1614, the present position of a doctor A and the flow line of the past one minute are displayed as the provision information.

FIG. 16B illustrates another example of a menu screen displayed by the web browser 151. In a menu screen 1620, similar to the menu screen of FIG. 16A, a pull-down menu 1621 of provision information and a pull-down menu 1622 of a display target, etc., are displayed. Furthermore, in the example of FIG. 16B, "display present position in real-time manner" is selected as the provision information, and "all patients" is selected as a display target. In this case, a pull-down menu 1623 of a display floor for selecting the floor to be displayed, etc., is displayed in the menu screen 1620.

In the example of FIG. 16B, as the user selects a "display information" button 1624, the present positions of all of the patients on floor A are displayed as the provision information.

Referring back to FIG. 14, the description of the sequence diagram of the process of providing information is continued.

In step S1405, the user performs an operation of selecting the provision information with respect to the menu screen, for example, illustrated in FIG. 16A.

In step S1406, the web browser 151 of the information terminal 150 accepts the selection operation by the user, and reports the information of the accepted operation, to the management server 130. At this time, the information of the operation reported to the management server 130 includes information such as the display target and the display condition, etc., selected in step S1405.

In step S1407, the display control unit 921 reports the operation information including information such as the display target and the display condition, etc., received from the information terminal 150, to the provision information generating unit 920.

In step S1408, the provision information generating unit 920 of the management server 130 acquires attribute information of the tag ID that is the display target from the tag ID management information 934 in the storage unit 922, based on the information such as the display target and the display condition, etc., included in the request to generate the provision information.

For example, in step S1405, it is assumed that "doctor A" has been selected as the display target as illustrated in the menu screen 1610 of FIG. 16A. In this case, the provision information generating unit 920 acquires the attribute information "person" of the tag ID "TAG0001" corresponding to "doctor A", from the tag ID management information 934, for example, illustrated in FIG. 12A.

In step S1409, the provision information generating unit 920 of the management server 130 acquires, from the threshold information 935 in the storage unit 922, the threshold information corresponding to the attribute information acquired in step S1408. For example, when the attribute information acquired in step S1408 is "person", the provision information generating unit 920 acquires the threshold "moving speed of less than or equal to 5 m/s" corresponding to the attribute information "person", from the threshold information 935 illustrated in FIG. 12B.

In step S1410, the provision information generating unit 920 of the management server 130 acquires position information of the display target from the position information 932 in the storage unit 922, based on the information such as the display target and the display condition, etc., included in the generation request to generate the provision information. For example, when "doctor A" (tag ID "TAG0001") is selected as the display target, the provision information generating unit 920 acquires the position information of tag ID "TAG0001" from the position information 932, for example, illustrated in FIG. 10B.

In step S1411, the provision information generating unit 920 of the management server 130 acquires chart information from the chart information 933 in the storage unit 922, based on the floor ID included in the position information acquired in step S1410. Note that when the chart information does not include chart data, but only includes reference information (URL information, etc.) for acquiring the chart data, the provision information generating unit 920 also acquires the chart data based on the reference information.

In step S1412, the provision information generating unit 920 of the management server 130 uses the acquired attribute information and the threshold information, etc., to execute a correction process of correcting the acquired position information.

In step S1413, the provision information generating unit 920 of the management server 130 generates the provision information by using the position information that has been subjected to the correction process.

For example, in steps S1412 and S1413, among the acquired position information, the provision information generating unit 920 identifies position information exceeding the range of the threshold information as incorrect position information, and generates the provision information from which the incorrect position information has been removed.

In step S1414, the provision information generating unit 920 of the management server 130 reports the generated provision information to the display control unit 921.

In step S1415, the display control unit 921 of the management server 130 sends the provision information generated by the provision information generating unit 920, to the information terminal 150, and causes the information terminal 150 to display the provision information.

In step S1416, the information terminal 150 displays a display screen of the provision information sent from the management server 130.

(Process of Correcting Position Information)

Figure 15B:
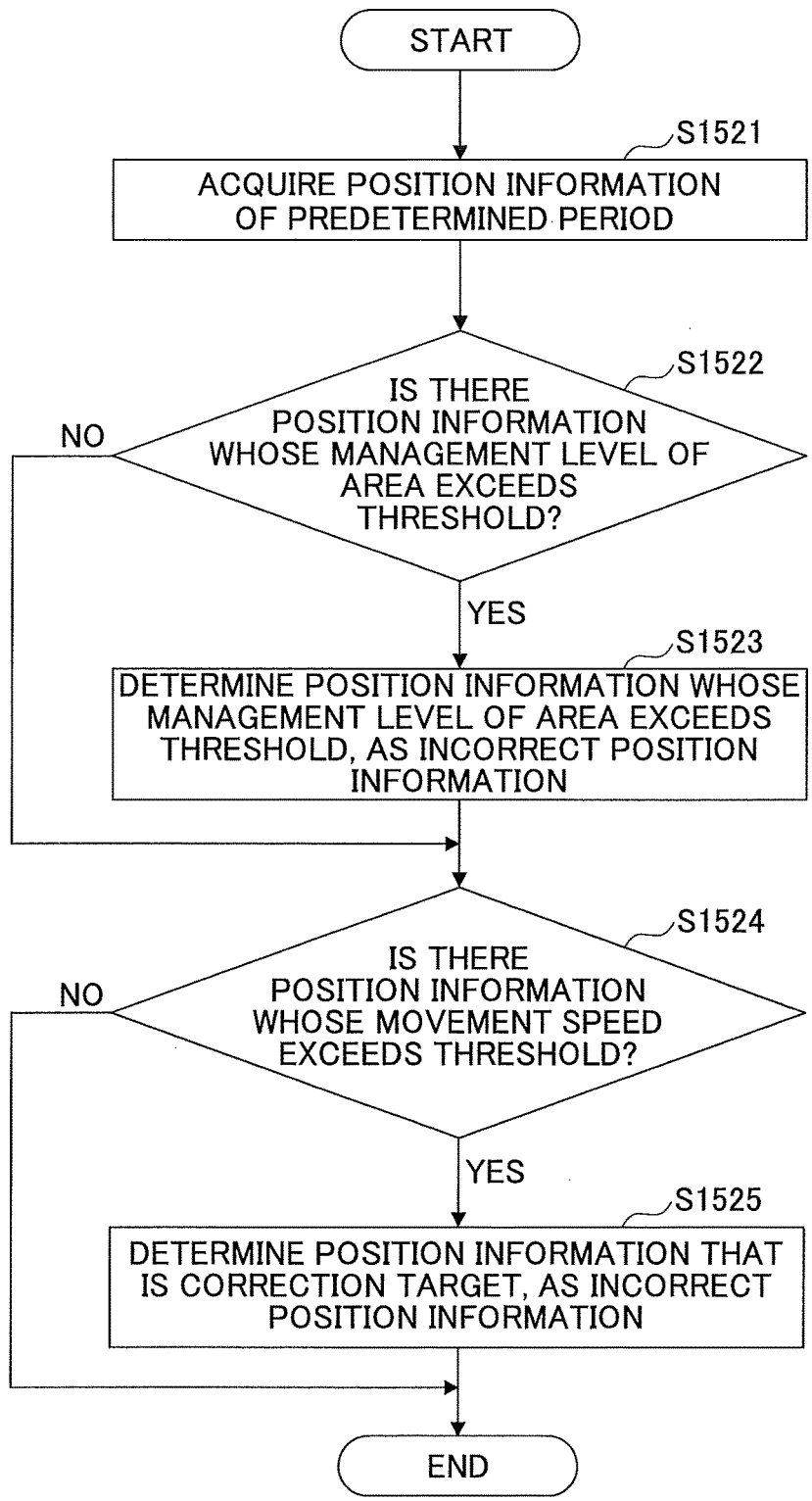

FIGS. 15A and 15B are flowcharts of examples of a process of correcting the position information according to the first embodiment. These processes of correcting the position information correspond to the process of step S1412 of FIG. 14.

FIG. 15A illustrates an example of a process of correcting the position information in a case where the threshold is the moving speed.

In step S1511, the provision information generating unit 920 of the management server 130 acquires position information of a predetermined time period to be used for generating the provision information.

For example, when the present position and a flow line of one minute of the doctor A are selected as the provision information in, for example, the menu screen 1610 of FIG. 16A, the provision information generating unit 920 acquires the position information of latest one minute, among the position information items corresponding to the tag ID of the doctor A.

In step S1512, the provision information generating unit 920 determines whether there is position information whose moving speed exceeds a threshold (for example, "moving speed of less than or equal to 5 m/s"), among the acquired position information.

When there is position information whose moving speed exceeds a threshold, in step S1513, the provision information generating unit 920 determines the position information whose moving speed exceeds a threshold, as incorrect position information. On the other hand when there is no position information whose moving speed exceeds a threshold, the provision information generating unit 920 ends the process.

By the above process, for example, the position information, which is detected at a position to which a person cannot move by a general walking speed, such as the position information of a doctor A502 at the time "13:05:38" in FIG. 5, is determined to be incorrect position information.

Furthermore, the provision information generating unit 920 creates provision information, by removing incorrect position information from the position information items within a predetermined time period. Accordingly, the management server 130 can cause the information terminal 150 to display the display screen of the provision information, for example, as illustrated in FIG. 17.

Figure 17:
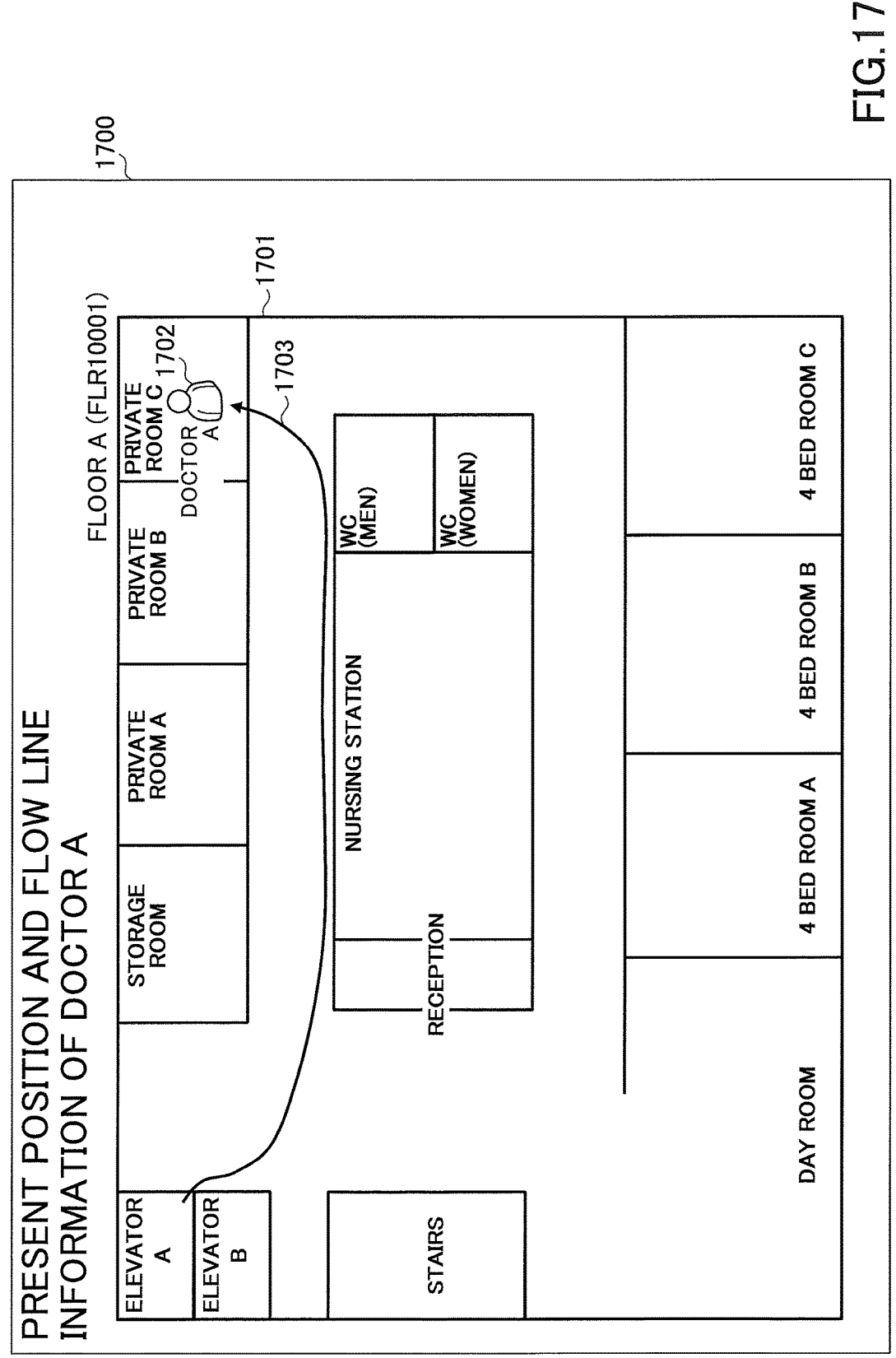
FIG. 17 illustrates an example of a display screen of the provision information according to the first embodiment of the present invention.

FIG. 17 illustrates an example of a display screen of the provision information according to the first embodiment. In FIG. 17, presently, in a display screen 1700 of provision information, a present position 1702 of a doctor A and a flow line 1703 of the doctor A in the past one minute are displayed on a floor map 1701 of a floor A that is the floor where the doctor A is presently located. According to the present embodiment, as described above, the management server 130 can reduce the impact of incorrect position information on the provision information.

FIG. 15B illustrates an example of a process of correcting the position information in a case where the thresholds are the moving speed and the management level of a floor. This process is an example of a case where there are two attribute information items and two thresholds with respect to one tag ID, as in the tag ID management information 934, the threshold information items 935a and 935b of FIGS. 12D and 12E.

In step S1521, the provision information generating unit 920 of the management server 130 acquires position information of a predetermined time period to be used for generating the provision information.

For example, when the present positions of all patients on a floor A are selected as the provision information in the menu screen 1610 of FIG. 16B, the provision information generating unit 920 acquires the position information of the latest 10 seconds (example of predetermined time period) of all patients. This information is acquired because, for example, if only the latest position information is used to display the present position of the patient B in FIG. 5, a failure may occur in that the present position of the patient B is displayed in the storage room or the private room A, or the patient B may not be displayed. Note that 10 seconds as the predetermined time period is one example, and the predetermined time period may be any other length of time.

In step S1522, the provision information generating unit 920 determines whether there is position information whose management level of the area exceeds a threshold (for example, a patient's threshold of "less than or equal to management level 2"), among the acquired position information.

For example, the provision information generating unit 920 identifies the management level of the area corresponding to each position information item, based on the "area ID" included in the position information and the "area type" included in the area information 1102 of the chart information illustrated in FIG. 11B. Furthermore, the provision information generating unit 920 determines whether there is position information whose management level of the area corresponding to the identified position information exceeds a patient's threshold "less than or equal to management level 2".

When there is no position information whose management level of the area exceeds a threshold, the provision information generating unit 920 shifts the process to step S1524. On the other hand, when there is position information whose management level of the area exceeds a threshold, the provision information generating unit 920 shifts the process to step S1523.

When the process shifts to step S1523, the provision information generating unit 920 determines the position information whose management level of the area exceeds a threshold, as incorrect position information. For example, when the patient's threshold is "less than or equal to management level 2", but the management level of the area where the position information of the patient has been detected is "3", the provision information generating unit 920 determines this position information as incorrect position information.

When the process shifts to step S1524, the provision information generating unit 920 determines whether there is position information whose moving speed exceeds a threshold (for example, "moving speed of less than or equal to 5 m/s"), among the acquired position information.

When there is position information whose moving speed exceeds a threshold, in step S1525, the provision information generating unit 920 determines the position information whose moving speed exceeds a threshold, as incorrect position information. On the other hand when there is no position information whose moving speed exceeds a threshold, the provision information generating unit 920 ends the process.

By the above process, for example, in FIG. 5, the position information of a patient B detected in the storage room is determined to be incorrect position information, when the management level of the storage room is "management level 3" and the patient's threshold is "less than or equal to management level 2".

Furthermore, the provision information generating unit 920 creates provision information, by removing incorrect position information from the position information items within a predetermined time period. Accordingly, the management server 130 can cause the information terminal 150 to display the display screen of the provision information, for example, as illustrated in FIG. 18.

Figure 18:
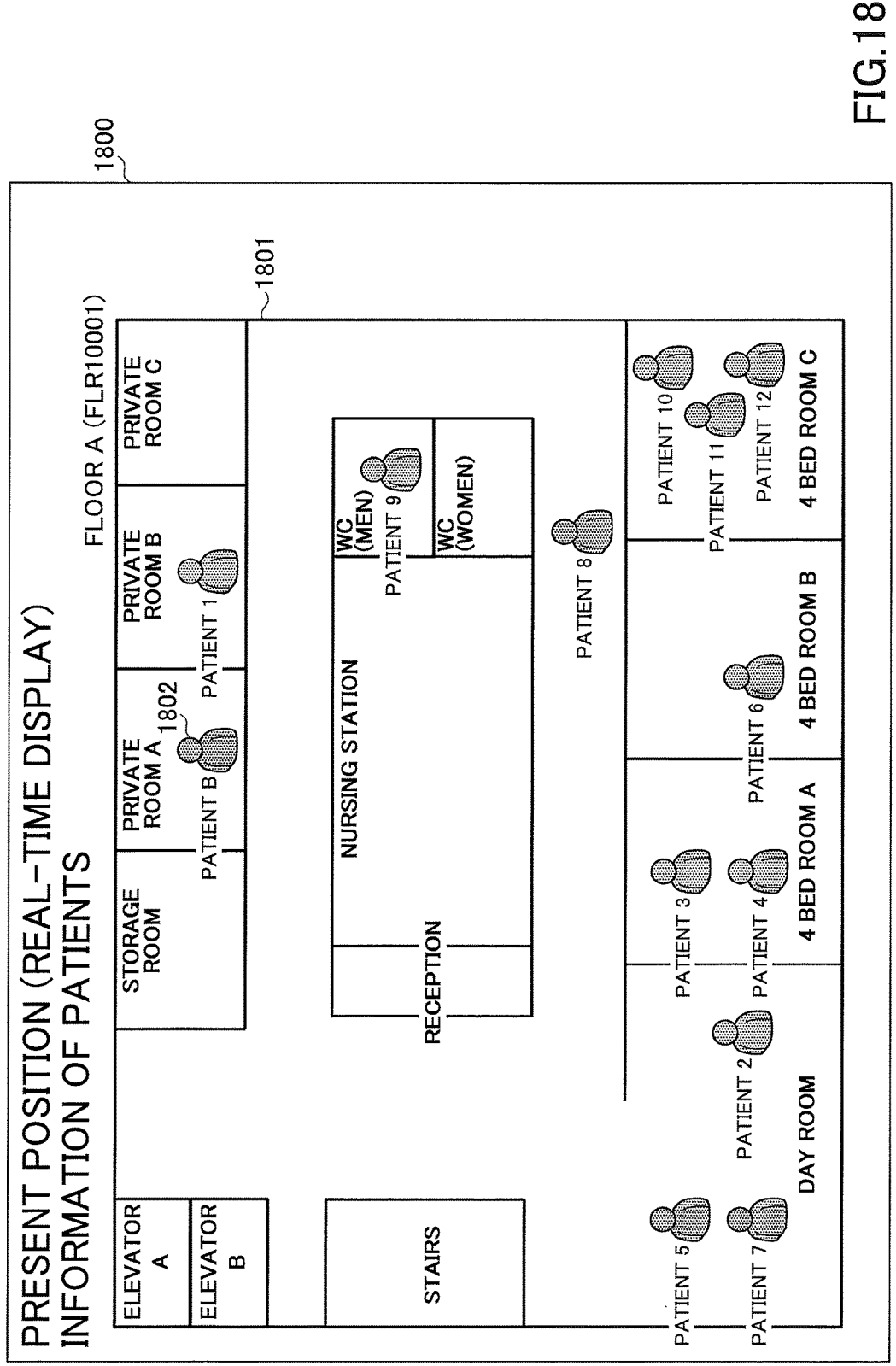
FIG. 18 illustrates another example of a display screen of the provision information according to the first embodiment of the present invention.

FIG. 18 illustrates another example of a display screen of the provision information according to the first embodiment. In FIG. 18, presently, in a display screen 1800 of provision information, the present positions of a plurality of patients including a patient B 1902 are displayed on a floor map 1801 of a floor A. Furthermore, the latest position information of the patient B is the storage room; however, the incorrect position information detected in the storage room has been removed, and the displayed provision information indicates that the patient B is in the private room A.

Note that the storage room of FIG. 18 is one example; the same effects can be achieved by setting a management level of greater than or equal to 3 for areas where the patient cannot enter, such as an operation room and a medical staff waiting room, etc.

As described above, according to the present embodiment, the information providing system 100 for providing provision information based on position information of the wireless tag 124 within a predetermined time period, and the management server 130 (information processing apparatus) by which the impact of the incorrect position information on the provision information can be reduced, can be provided.

Second Embodiment

In the first embodiment, a description is given of an example of a case where the management server 130, which manages the position information of the wireless tag 124, provides the provision information. However, in a second embodiment, a description is given of an example of a case where an information providing server, which is provided separately from the management server 130, provides the provision information.

<Functional Configuration>

Figure 19:
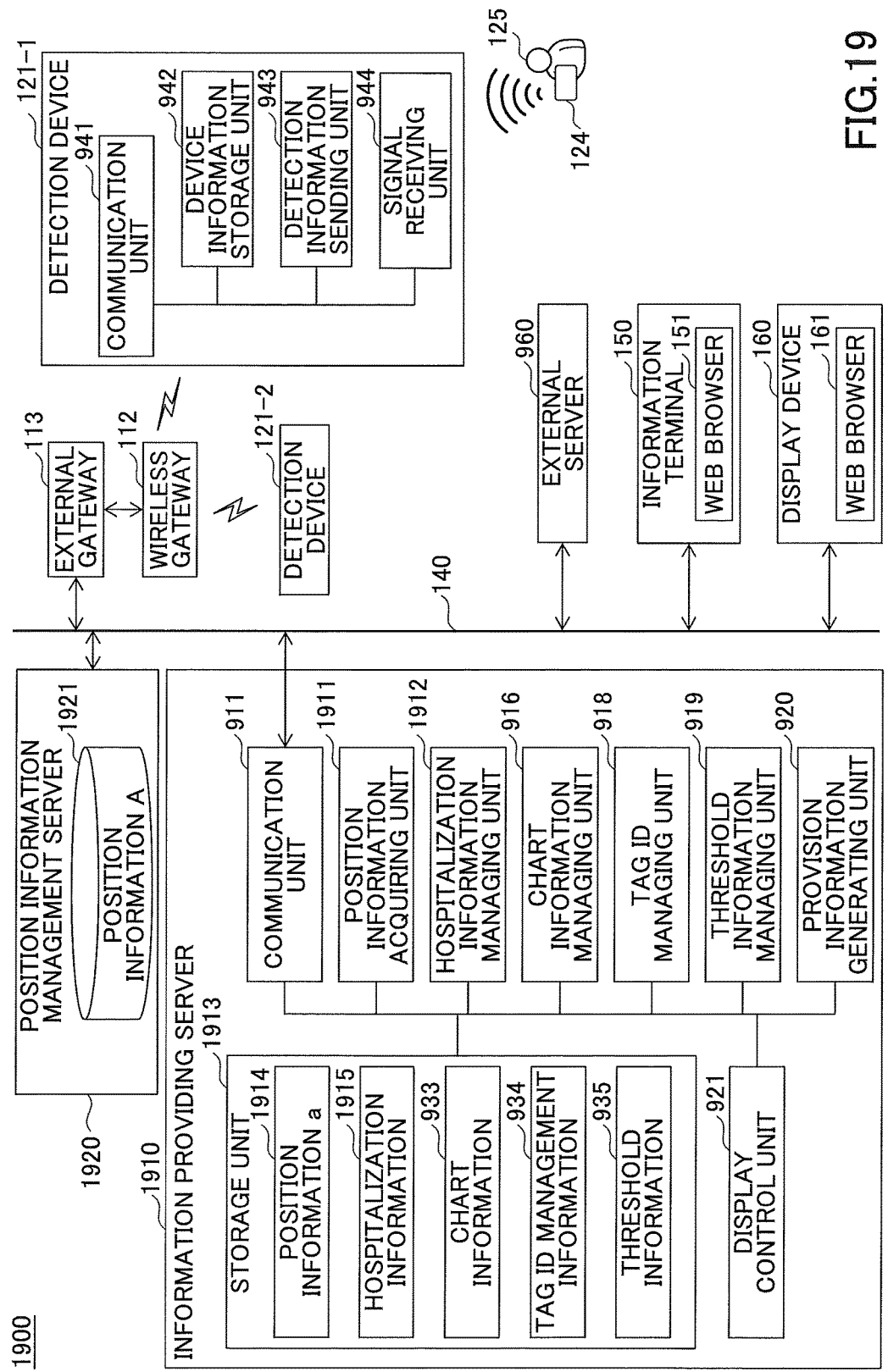
FIG. 19 illustrates a functional configuration of an information providing system according to a second embodiment of the present invention.

FIG. 19 illustrates a functional configuration of an information providing system 1900 according to the second embodiment. In the information providing system 1900 according to the second embodiment illustrated in FIG. 19, the functions of the management server 130 according to the first embodiment illustrated in FIG. 9 are provided in a distributed manner in a position information management server 1920 and an information providing server 1910.

Note that the hardware of the position information management server 1920 and the information providing server 1910 is configured by, for example, the computer 600 as illustrated in FIG. 6, or by a plurality of the computers 600. (Position Information Management Server)

The position information management server 1920 includes, for example, the communication unit 911, the device information managing unit 912, the detection information receiving unit 913, the position information identifying unit 914, the position information managing unit 915, and the storage unit 922, etc., of the management server 130 according to the first embodiment illustrated in FIG. 9. Similar to the management server 130 according to the first embodiment, the position information management server 1920 stores the position information of a plurality of wireless tags 124, etc., in the storage unit 922, and manages the position information.

Furthermore, it is assumed that the position information management server 1920 provides requested position information to the request source, in response to a request to acquire position information from the information providing server 1910.

Note that in the present embodiment, the position information managed by the position information management server 1920 is referred to as "position information A1921", and the position information managed by the information providing server 1910 is referred to as "position information a1914" to distinguish these position information items.

It is assumed that the position information A1921 stores the same information as that stored in the position information 932 of the management server 130 according to the first embodiment.

(Information Providing Server)

The information providing server 1910 includes the communication unit 911, the chart information managing unit 916, the tag ID managing unit 918, the threshold information managing unit 919, the provision information generating unit 920, and the display control unit 921, etc., among the elements of the management server 130 according to the first embodiment illustrated in FIG. 9.

Furthermore, the information providing server 1910 includes a position information acquiring unit 1911 and a hospitalization information managing unit 1912, etc.

The position information acquiring unit 1911 acquires position information necessary for generating the provision information, from the position information management server 1920, and stores the acquired position information in the position information a1914 in a storage unit 1913. The position information acquiring unit 1911 is realized by, for example, programs, etc., executed by the CPU 601 of FIG. 6.

The hospitalization information managing unit 1912 stores, for example, the information of a hospital room, etc., of a patient hospitalized in a hospital, etc., in hospitalization information 1915 in the storage unit 1913, and manages the information. Alternatively, the hospitalization information managing unit 1912 may acquire the hospitalization information 1915 necessary for generating the provision information, from a medical information management server (for example, the external server 960) managing medical information. The hospitalization information managing unit 1912 is realized by, for example, programs, etc., executed by the CPU 601 of FIG. 6.

FIGS. 20A and 20B illustrate examples of the tag ID management information 934 and the hospitalization information 1915 according to the second embodiment.

FIG. 20A illustrates an example of the tag ID management information 934 according to the second embodiment. The tag ID management information 934 illustrated in FIG. 20A includes information of an "association ID", in addition to the information managed in the tag ID management information 934 of FIG. 12A. The "association ID" is identification information used for associating the information with another database (for example, the hospitalization information 1915).

FIG. 20B illustrates an example of the hospitalization information 1915 according to the second embodiment. In the example of FIG. 20B, the hospitalization information 1915 includes information such as "patient ID", "name", and "hospital room", etc.

The "patient ID" is identification information for identifying a patient at a hospital, etc. The "name" is information indicating the name of the patient. The "hospital room" is information indicating the hospital room in which the patient is hospitalized. For example, "hospital room" corresponds to "area name", etc., in the area information 1102 of FIG. 11B. The "association ID" corresponds to the "association ID" in the tag ID management information 934 of FIG. 20A.

For example, in the tag ID management information 934 of FIG. 20A, the patient B corresponds to the association ID "REF0002". Furthermore, in the hospitalization information 1915 of FIG. 20B, the association ID "REF0002" corresponds to the patient ID "PID3001" and the hospital room "private room A". Accordingly, it can be determined that the patient B is hospitalized in the private room A.

Note that in FIG. 19, the hospitalization information managing unit 1912 and the hospitalization information 1915 are optional, and not essential.

<Process Flow>

Figure 21:
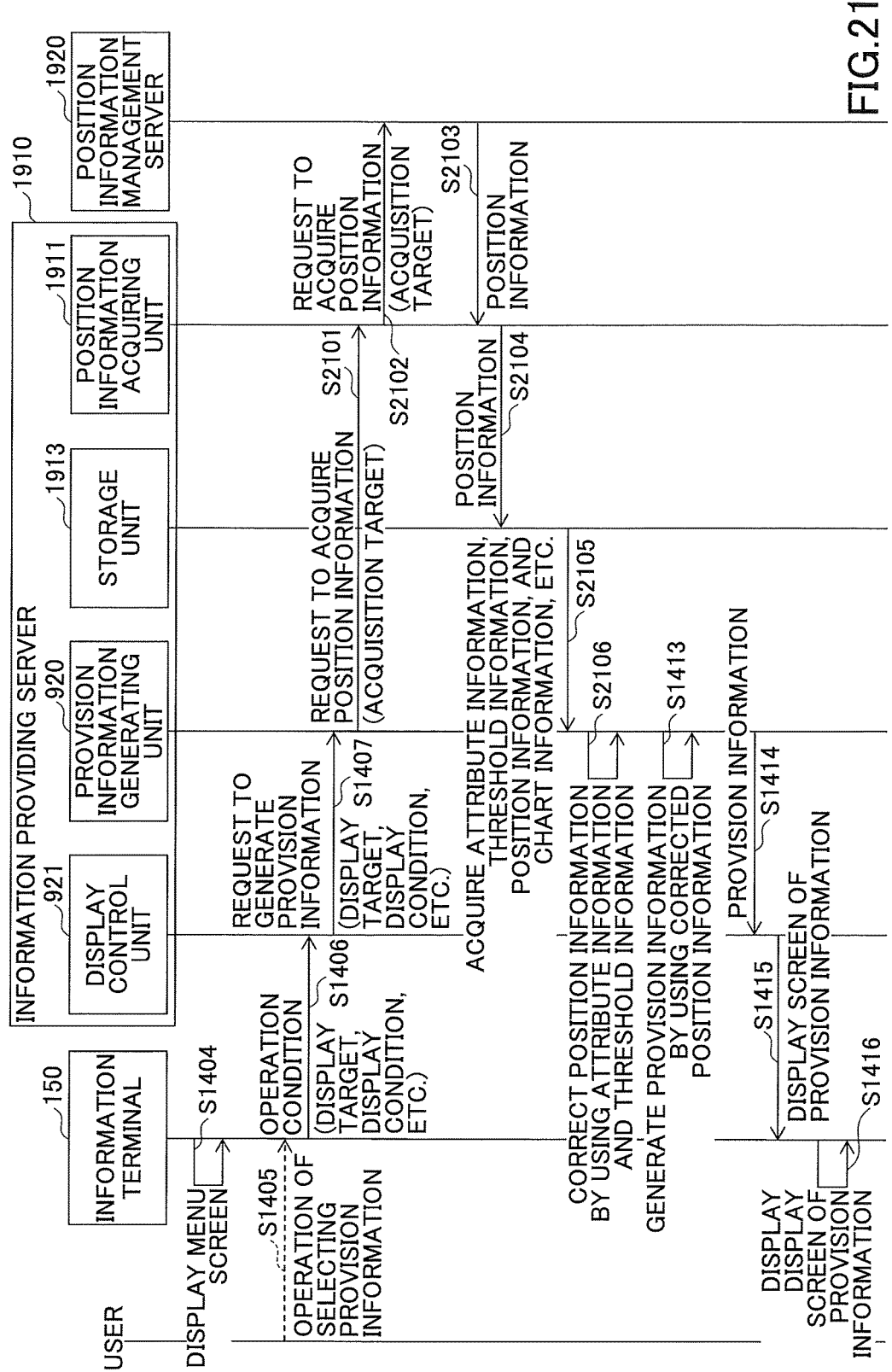
FIG. 21 is a sequence diagram illustrating an example of a process of providing information according to the second embodiment of the present invention.

FIG. 21 is a sequence diagram illustrating an example of a process of providing information according to the second embodiment. In FIG. 21, the processes of steps S1404 through S1407 and steps S1413 through S1416 are the same as those of the process of providing information according to the first embodiment illustrated in FIG. 14. Therefore, the points that are different from the first embodiment are mainly described below.

In step S2101, when the provision information generating unit 920 of the information providing server 1910 accepts a request to generate the provision information from the display control unit 921, the provision information generating unit 920 sends a request to acquire the position information to the position information acquiring unit 1911. This acquisition request to acquire the position information includes, for example, information such as the tag ID that is the acquisition target and the acquisition time period, etc.

In step S2102, the position information acquiring unit 1911 of the information providing server 1910 sends a request to acquire the position information including information such as the tag ID that is the acquisition target and the acquisition time period, etc., to the position information management server 1920.

In step S2103, the position information management server 1920 sends the requested position information to the information providing server 1910.

In step S2104, the position information acquiring unit 1911 of the information providing server 1910 stores the position information received from the position information management server 1920, in the position information a1914 in the storage unit 1913.

In step S2105, the provision information generating unit 920 of the information providing server 1910 acquires attribute information, threshold information, position information, and chart information, etc., from the storage unit 1913. These processes correspond to, for example, the processes of steps S1408 through S1411 of FIG. 14.

In step S2106, the provision information generating unit 920 of the management server 130 uses the acquired attribute information and threshold information, etc., to execute a correction process of correcting the acquired position information. This process corresponds to, for example, step S1412 of FIG. 14 and the correction process of the position information of FIGS. 15A and 15B, etc.

The subsequent processes (steps S1413 through S1416) are the same as those of the first embodiment illustrated in FIG. 14.

As described above, even when the information providing server 1910 is provided outside of the position information management server 1920 for managing the position information, the information providing server 1910 can provide the provision information in the same manner as that of the first embodiment.

Furthermore, in a preferable example, in step S2105 of FIG. 21, the provision information generating unit 920 may further acquire the hospitalization information 1915 from the storage unit 1913, and add the hospitalization information 1915 in step S2106, to correct the position information.

For example, in the display screen 1800 of FIG. 19, when the position information of a patient 1 is detected alternately in a private room B and a private room C, and the moving speed exceeds a threshold, the hospitalization information 1915 illustrated in FIG. 20A may be used to determine that the position information detected in the private room C is incorrect position information.

Furthermore, the provision information generating unit 920 may add various kinds of medical information other than the hospitalization information 1915 of FIG. 20A, to correct the position information of a patient.

Another Embodiment

In the first and second embodiments, a description is given of a case where the floor of the indoor facility 200 is the floor of a hospital; however, the information providing system 100 according to an embodiment of the present invention may be applicable to various places other than a floor of a hospital.

For example, the floor of the indoor facility 200 may be a floor of a retail store such as a supermarket and a department store. Furthermore, the holding subject that is holding the wireless tag 124 may be, for example, an object such as a shopping cart.

Figure 22:
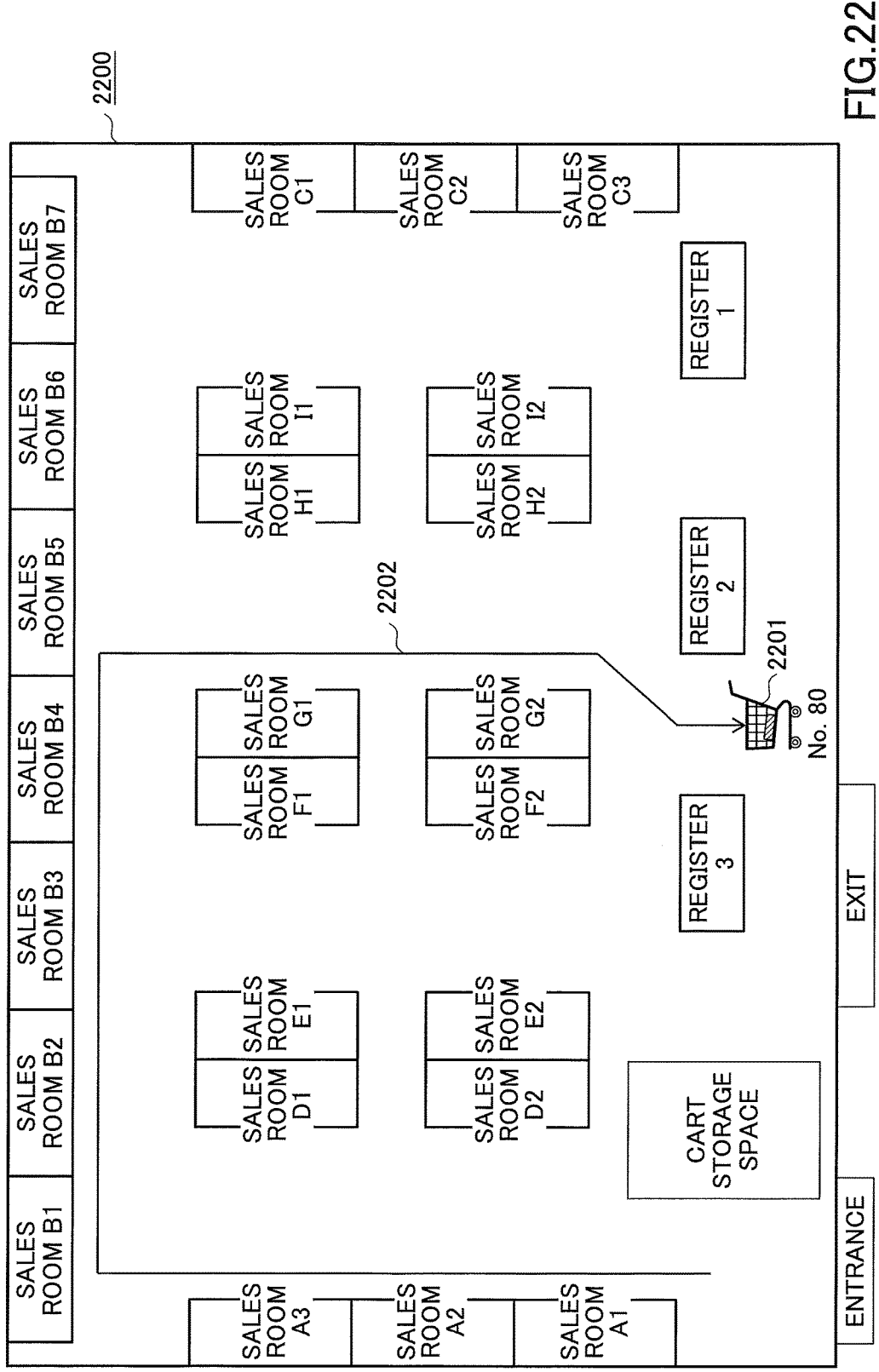
FIG. 22 illustrates an example of provision information according to another embodiment.

FIG. 22 illustrates an example of provision information according to another embodiment. FIG. 22 illustrates an example of a floor map 2200 of a retail store where customers shop by using a shopping cart 2201. In the example of FIG. 22, the wireless tag 124 is attached to the shopping cart 2201, the detection device 121 is disposed on the ceiling, etc., of the floor, and by forming areas, for example, as illustrated in FIG. 4, the management server 130, etc., can store position information of the shopping cart 2201 and manage the position information.

Furthermore, the management server 130, etc., uses the stored position information of the shopping cart 2201, for example, to cause the information terminal 150 and the display device 160, etc., to display flow line information 2202 of the shopping cart 2201 of FIG. 22, as provision information.

Furthermore, the management server 130, etc., can provide provision information indicating the usage information of the store, by a heat map, etc., indicating the flow line information of a plurality of shopping carts 2201 and the locations where many shopping carts 2201 assemble.

Furthermore, also in a retail store as illustrated in FIG. 22, employees of the retail store may carry the wireless tag 124, and the flow lines of the employees may be displayed as provision information on the information terminal 150 and the display device 160, etc.

Similarly, the information providing system 100 may also cause the information terminal 150 and the display device 160, etc., to display, as provision information, the present positions and the flow lines, etc., of employees and students, etc., at offices and schools, etc.

According to one embodiment of the present invention, the impact of incorrect position information on provision information can be reduced, in an information processing system for providing the provision information based on position information within a predetermined time period of a transmission device.

The information processing apparatus, the program product, and the method are not limited to the specific embodiments described in the detailed description, and variations and modifications may be made without departing from the spirit and scope of the present invention.

What is claimed is:

1. An information processing apparatus for providing provision information based on one or more position information items within a predetermined time period of a transmission device that sends out a signal including identification information of the transmission device, the information processing apparatus comprising a processor, in communication with a memory, executing a process including:
    storing a correspondence relationship between the identification information of the transmission device and an attribute information item that is information of a holding subject that is holding the transmission device;
    storing a threshold defining a predetermined value corresponding to the attribute information item, for each one of the attribute information items;
    storing the one or more position information items of the transmission device in time series in association with the identification information of the transmission device; and
    generating the provision information by acquiring the stored one or more position information items of the transmission device within the predetermined time period, and correcting the acquired one or more position information items with the use of the attribute information item corresponding to the identification information of the transmission device or the threshold corresponding to the attribute information item.

2. The information processing apparatus according to claim 1, the process further comprising:
    receiving detection information from a detection device that detects the signal sent out by the transmission device, the detection information including the identification information of the transmission device included in the signal detected by the detection device; and
    identifying the one or more position information items of the transmission device, based on the received detection information.

3. The information processing apparatus according to claim 1, wherein the generating includes removing the one or more position information items, which exceed the threshold corresponding to the attribute information item of the holding subject holding the transmission device, from the one or more position information items of the transmission device within the predetermined time period, to generate the provision information.

4. The information processing apparatus according to claim 1, wherein the threshold includes information, which indicates a moving speed or a movement distance, corresponding to the attribute information item.

5. The information processing apparatus according to claim 1, wherein the threshold includes information, which indicates a management level of an area where the holding subject is able to enter, corresponding to the attribute information item.

6. The information processing apparatus according to claim 1, wherein the holding subject is a person carrying the transmission device or an object to which the transmission device is attached.

7. The information processing apparatus according to claim 1, wherein the provision information includes flow line information indicating a path along which the holding subject holding the transmission device has moved, or information of a present position of the transmission device.

8. The information processing apparatus according to claim 1, the process further comprising:
displaying the provision information, which has been generated by the provision information generator, on a display device.

9. The information processing apparatus according to claim 1, wherein the one or more position information items of the transmission device are stored at predetermined time intervals.

10. A non-transitory program product for being executed on a computer, to cause an information processing apparatus to execute a process, the information processing apparatus providing provision information based on one or more position information items within a predetermined time period of a transmission device that sends out a signal including identification information of the transmission device, the process comprising:
storing a correspondence relationship between the identification information of the transmission device and an attribute information item that is information of a holding subject that is holding the transmission device;
storing a threshold defining a predetermined value corresponding to the attribute information item, for each one of the attribute information items;
storing the one or more position information items of the transmission device in time series in association with the identification information of the transmission device; and
generating the provision information by acquiring the stored one or more position information items of the transmission device within the predetermined time period, and correcting the acquired one or more position information items with the use of the attribute information item corresponding to the identification information of the transmission device or the threshold corresponding to the attribute information item.

11. A method performed by an information processing apparatus for providing provision information based on one or more position information items within a predetermined time period of a transmission device that sends out a signal including identification information of the transmission device, the method comprising:
storing a correspondence relationship between the identification information of the transmission device and an attribute information item that is information of a holding subject that is holding the transmission device;
storing a threshold defining a predetermined value corresponding to the attribute information item, for each one of the attribute information items;
storing the one or more position information items of the transmission device in time series in association with the identification information of the transmission device; and
generating the provision information by acquiring the stored one or more position information items of the transmission device within the predetermined time period, and correcting the acquired one or more position information items with the use of the attribute information item corresponding to the identification information of the transmission device or the threshold corresponding to the attribute information item.

* * * * *